(12) United States Patent
Kaushal et al.

(10) Patent No.: US 8,723,869 B2
(45) Date of Patent: May 13, 2014

(54) BIOLOGICALLY BASED CHAMBER MATCHING

(75) Inventors: Sanjeev Kaushal, San Jose, CA (US);
Kenji Sugishima, Tokyo (JP); Sukesh Janubhai Patel, Cupetino, CA (US);
Robert Filman, Menlo Park, CA (US);
Wolfgang Polak, Sunnyvale, CA (US);
Orion Wolfe, Oakland, CA (US); Jessie Burger, Montain View, CA (US)

(73) Assignee: Tokyo Electron Limited, Tokyo (JP)

( * ) Notice: Subject to any disclaimer, the term of this patent is extended or adjusted under 35 U.S.C. 154(b) by 516 days.

(21) Appl. No.: 13/052,943

(22) Filed: Mar. 21, 2011

(65) Prior Publication Data
US 2012/0242667 A1    Sep. 27, 2012

(51) Int. Cl.
*G06T 11/20* (2006.01)
(52) U.S. Cl.
USPC .......................... 345/440; 345/644; 702/182
(58) Field of Classification Search
USPC .................... 345/440, 644; 702/182
See application file for complete search history.

(56) References Cited

U.S. PATENT DOCUMENTS

| 7,062,411 B2 | 6/2006 | Hopkins et al. |
| 2008/0077362 A1 | 3/2008 | Willis et al. |
| 2009/0240366 A1 | 9/2009 | Kaushal et al. |

OTHER PUBLICATIONS

International Search Report and Written Opinion, mailing date Jun. 19, 2012, for International Application No. PCT/US12/29847, 11 pages.

*Primary Examiner* — Maurice L McDowell, Jr.
(74) *Attorney, Agent, or Firm* — Amin, Turocy & Watson, LLP

(57) ABSTRACT

The subject disclosure relates to automatically learning relationships among a plurality of manufacturing tool parameters as applied to arbitrary semiconductor manufacturing tools and a graphical user interface that is supported, at least in part, by an autonomous learning system. The graphical user interface can create one or more matrixes based on received data and can further generate additional matrices by transforming the one or more matrixes. A series of windows can be output, wherein the series of windows, provide performance analysis that comprises a matching between a focus chamber and a reference chamber. In an aspect, the focus chamber and the reference chamber can be different chambers. In another aspect, the focus chamber and the reference chamber can be the same chamber, which provides analysis of the deterioration in performance of the same chamber over time.

32 Claims, 13 Drawing Sheets

US 8,723,869 B2

BIOLOGICALLY BASED CHAMBER MATCHING

TECHNICAL FIELD

The subject disclosure generally relates to a learning system that automatically learns relationships between tool parameters associated with a semiconductor manufacturing process.

BACKGROUND

Progressive technological evolution of electronics and computing devices motivates advances in semiconductor technology. In addition, growing consumer demand for smaller, higher performance, and more efficient computer devices and electronics has lead to down scaling of semiconductor devices. In addition, to meet device demand while restraining costs, silicon wafers upon which semiconductor devices are formed have increased size.

Fabrication plants working with large wafer sizes utilize automation to implement and control wafer processing. Such plants can be capital intensive and, accordingly, it is desirable to maintain highly efficient operation of fabrication equipment to minimize downtime and maximize yields. To facilitate these goals, measurement equipment can be employed to monitor fabrication equipment during wafer processing and to acquire measurement information on both the equipment and the processed wafer. The measurement information can be analyzed to optimize fabrication equipment.

According to an example, the measurement information can include tool level information, which indicates a state or condition of fabrication equipment or a portion thereof, wafer metrology information specifying physical and/or geometric conditions of wafers being processed, electrical text information, and the like. In addition, spectroscopic data, e.g., spectral line intensity information, can be gathered to facilitate identification of etch endpoints by process engineers. However, in conventional fabrication environments, various measurement data is handled independently of one another, for different purposes. Accordingly, inter-relationships among various measurement data are not leveraged for advanced optimization of fabrication processes.

The above-described deficiencies of today's semiconductor fabrication measurement and optimization systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, a biologically based learning system autonomously learns relationships among a plurality of manufacturing tool parameters as applied to arbitrary semiconductor manufacturing tools. In accordance with some aspects, the biologically based learning system can be utilized with a plasma etch tool, a track tool, an oxide etch tool, and so forth. Moreover, the one or more embodiments allow arbitrary data to be supplied to the biologically based learning system in a flexible and incremental manner. The learning system can be targeted to rapidly identify tool behavior differences between a reference chamber and chamber whose performance is to be matched to the reference chamber or for a reference chamber at different time intervals. Further, the one or more embodiments can enable rapid analysis and decision making to identify tool parameters that are the most plausible cause for performance degradation.

The biologically based learning system is configured to extend capabilities of chamber matching performance by providing a graphical user interface (GUI) for the rapid diagnosis and identification of tool parameters that are correlated to the loss of chamber performance. For example, the graphical user interface can create one or more matrixes based on received data and can further generate additional matrices by transforming the one or more matrixes. A series of windows can be output, wherein the series of windows provide performance analysis that comprises a matching between a focus chamber and a reference chamber. In an aspect, the focus chamber and the reference chamber can be different chambers. In another aspect, the focus chamber and the reference chamber can be the same chamber, which provides analysis of the deterioration in performance of the same chamber over time.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
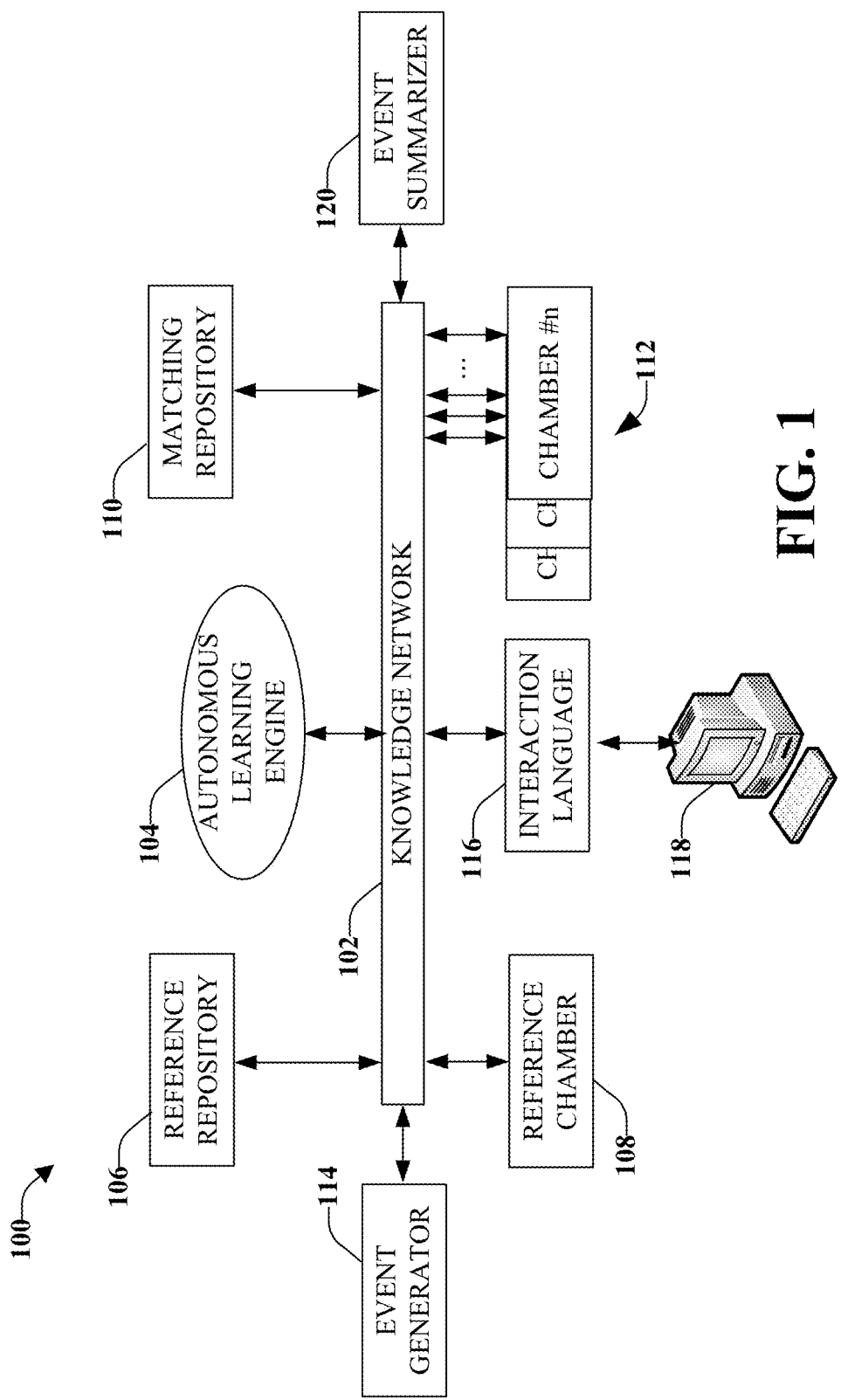
FIG. 1 illustrates an exemplary high level biologically based learning system, according to an aspect.

In the semiconductor-processing field, various process chambers can be utilized in association with a wafer handling system or device to perform a variety of semiconductor processes. Semiconductor wafer processing systems comprise multiple process chambers. Such systems process semiconductor wafers through a series of sequential steps to create integrated circuits.

In many cases, tool engineers analyze the deterioration in performance of the same chamber over time. Thus, the disclosed aspects can allow the user to select both the reference chamber and the focus chamber as being the same chamber in the measures of merit window, which allows for analysis of the same chamber over time. Provided is a graphical user interface that is supported, at least in part, by a biologically based chamber matching learning system. The graphical user interface can provide rapid analysis of chamber matching performance for semiconductor manufacturing tools.

An aspect relates to a graphical user interface that provides rapid analysis of chamber matching performance for semiconductor manufacturing tools. The graphical user interface comprises an importer that receives information indicative of a reference chamber and at least one focus chamber and a generate component that creates at least one matrix based on the information. The graphical user interface also comprises a transform component that generates one or more additional matrices of data by transforming the at least one matrix. Further, the graphical user interface comprises an output component that renders a progression of windows as a function of the one or more additional matrices, wherein the progression of windows comprises performance analysis results that compare the reference chamber and the at least one focus chamber.

In an example, the information indicative of the reference chamber and the at least one focus chamber comprises sensor measurements, tool performance counter readings, metrology data, process recipes, system recipes, or combination thereof. In another example, the graphical user interface is a front end for a biologically based learning system that directly connects to one or more tools to receive the information, to display the performance analysis results, or combinations thereof. In a further example, the graphical user interface is supported by an autonomous system that learns behavior of a tool associated with the reference chamber or the at least one focus chamber.

According to an aspect, the importer receives the information collected at an arbitrary sampling frequency and the generate component constructs the at least one matrix at a lower frequency. In another aspect, the generate component creates at least two matrixes, wherein each matrix comprises a different time resolution. In a further aspect, the generate component creates summary statistics for the information, wherein the summary statistics comprise, for each time resolution, a mean, a standard deviation, a range, a maximum, a minimum, or combinations thereof.

In an example, the output component renders a first window that receives a selection of one or more chambers and a selection of one or more tools from several tools for performance analysis. In another example, the output component renders a second window that comprises a list of tool performance measures and can receive at least one of: a selection of the reference chamber and the at least one focus chamber from a plurality of chambers; a selection of performance levels or performance level ranges; or a selection of a set of system recipes and process recipes as a focus of the analysis.

In a further example, the output component renders a second window that can receive a selection of the same chamber as the at least one focus chamber and the reference chamber.

In another example, the output component renders a third window that comprises a time-based trend as a function of the selection in the second window, wherein the trend is a function of a configurable date range. The third window can receive a selection of at least one lot from a set of lots, wherein the selection identifies at least one lot for the at least one focus chamber and at least one lot for the reference chamber.

In a further example, the output component renders a fourth window that displays a first chart for the reference chamber and a second chart for the at least one focus chamber. The fourth window can be an error comparison window that is dynamically modified as a function of changes to a start date or an end date for the at least one focus chamber or the reference chamber.

In accordance with some aspects, the graphical user interface is supported, at least in part, by an autonomous system that learns a functional relationship and the fourth window uses the functional relationship to identify tool parameters that impact a measures of merit from the second window.

In another example, the output component renders a fifth window that displays tick-by-tick trend lines at a wafer level. Further, the output component renders a sixth window that displays a third chart for the at least one focus chamber and a fourth chart for the reference chamber, wherein the third chart and the fourth chart indicate performance levels of wafers in the at least one focus chamber and the reference chamber.

In accordance with some aspects, the graphical user interface comprises a notification component that propagates one or more changes to each window in the progression of windows. The progression of windows can comprise a tool and chamber selection window, a measures of merit window, a data range window, an error comparison window, a wafer level comparison window, a report window, or combinations thereof.

In accordance with some aspects, a system for biologically based chamber matching is provided. The system comprises an autonomous learning system that determines a behavior of a tool. The system also comprises a graphical user interface that expresses an output of interest, based on the behavior, as a function of one or more tool sensors, tool maintenance counters, or other metrology data, wherein the output of interest is a performance comparison of a focus chamber and a reference chamber.

In an aspect, the graphical user interface is a front end for the autonomous learning system and directly connects to one or more tools to receive data, to display analysis results, or combinations thereof. According to an aspect, the graphical user interface imports sensor measurements, tool performance counters readings, metrology data, process recipes, system recipes, or combinations thereof.

In accordance with some aspects, the graphical user interface creates one or more matrixes and the autonomous learning system learns each column of the one or more matrixes as a function of other columns and generates a sample for each column. In some aspects, the graphical user interface expresses the output of interest as a progression of windows that build upon each other.

According to an aspect, the graphical user interface provides a means to drill down into details of the focus chamber, the reference chamber, or both the focus chamber and the reference chamber. In accordance with some aspects, the graphical user interface is tool independent.

In an example, the reference chamber and the focus chamber are the same chamber. In another example, the reference chamber and the focus chamber are different chambers.

Another aspect relates to a method for providing chamber matching performance analysis results. The method comprises receiving data indicative of a focus chamber and a reference chamber and creating at least one matrix based on the received data. The method also comprises generating additional matrices by transforming the at least one matrix and rendering a series of windows that provide performance analysis information between the focus chamber and the reference chamber.

In accordance with some aspects, the method further comprises receiving a selection of a first chamber as the reference chamber and a second chamber as the focus chamber, wherein the first chamber and the second chamber are different chambers. In another aspect, the method comprises receiving a selection of a first chamber as both the reference chamber and the focus chamber.

According to some aspects, the series of windows comprise a tool and chamber selection window, a measures of merit window, a data range window, an error comparison window, a wafer level comparison window, a report window, or combinations thereof.

In accordance with some aspects, the method further comprises receiving a change to a first parameter in at least one window of the series of windows and automatically updating at least a second parameter in all dependent windows of the series of windows.

Herein, an overview of some of the embodiments for improving performance of semiconductor production equipment though automated learning has been presented above. As a roadmap for what follows next, various exemplary, non-limiting embodiments and features for automated learning and an associated graphical user interface are described in more detail. Then, some non-limiting implementations and examples are given for additional illustration.

Biologically Based Chamber Matching

By way of further description with respect to one or more non-limiting ways to perform biologically based chamber matching, a block diagram of an exemplary high level biologically based learning system 100 is illustrated generally by FIG. 1. The biologically based learning system 100 includes a knowledge network 102 that is configured to enable collection of data from manufacturing tools and chambers. The biologically based learning system 100 is supported by an autonomous learning engine 104 that is capable of any-to-any learning. The biologically based learning system 100 includes a reference repository 106 that is configured to retain or store behavioral attributes of a reference chamber 108 when the reference chamber 108 is performing well (e.g., is operating at a good performance level, is operating at a peak capable performance level, and so forth). The behavioral attributes that are stored can be those behavioral attributes that are considered important (or significant) for reliability and repeatability of systems and processes that increase productivity, meet or exceed desired performance levels, reduce costs, or provide other benefits. Further, such behavior attributes can be utilized as a base line for monitoring behavior of one or more chambers within a semiconductor manufacturing facility or another facility.

Also included in the biologically based learning system 100 is a matching repository 110 that is configured to compare the current performance of the reference chamber 108 to itself (when the reference chamber 108 is performing well (e.g., operating close to peak performance)). In accordance with some aspects, the matching repository 110 is configured to compare the reference chamber 108 to a different chamber (illustrated by a plurality of chambers #n 112, where n is an integer). An event generator 114 included in biologically based learning system 100 is configured to generate events (of interest) when performance degradation has occurred so that maintenance activities can be performed before significant loss to operations. For example, events can be processed into an interaction language 116 (e.g., machine language-to-human language, human language-to machine language, and so forth) and output to (or received from) an actor (e.g., user, another system, and so forth) though a computer 118, for example. In accordance with some aspects, the events, created by event generator 114, can be compiled, by an event summarizer 120, and output to an actor (e.g., through the computer 118).

The autonomous learning engine 104 is configured to learn the behavioral relationships among a set of variables that expresses each output variable of interest (e.g., chamber pressure or Etch-Rate) as a function of independent variables (e.g., gas flows, temperatures, power, age of focus-ring, age of Electro Static Chuck (ESC), spectral intensity measurements, and so forth). The autonomous learning engine 104 is equipped with capabilities to ignore independent variables that do not influence the output of interest (e.g., power generally will not influence pressure so power will not be included in the function that describes the behavior of the pressure.) The autonomous learning engine 104 communicates to other components of the biologically based learning system 100 through the knowledge network 102. The knowledge network 102 is further configured to provide priority based messaging among all components of the biologically based learning system 100, including external agents or actors (e.g., a fabrication engineer) through a computer 118, for example.

In accordance with some aspects, the knowledge network 102 can comprise an adapter for the reference chamber 108. The adaptor downloads sensor data and recipes and passes them to the reference repository 106 for storage and subsequent usage. Each chamber 112 that is to be matched is also connected to the biologically based learning system 100 with an adapter. Data including manufacturing data, generated by the tool, and the corresponding recipes are passed to the matching repository 110.

The biologically based learning system 100 is configured to extend the capabilities of a biologically based chamber matching system by providing a graphical user interface (GUI) for the rapid diagnosis and identification of tools parameters that are correlated to a loss of chamber performance.

The biologically based learning system 100 can be supplied with one or more runs of wafer data for the reference chamber 108. The training data can be obtained directly from the tool. Alternatively or additionally, the training data can be submitted to the biologically based learning system 100 through a data importer, for example. The training data is received per wafer and includes data such as recipe parameter settings for each recipe parameter and sensor readings, tool maintenance counters and metrology measurements. In accordance with some aspects, the metrology measurements can be arbitrary or random. The sensor readings can be received with a timestamp of all measured sensors during the processing of the wafer (e.g., Lower Vpp values at every $\frac{1}{10}$-th of a second during the process, ESC voltage measured every second during the process, spectral intensity at several wavelengths measured every $\frac{1}{10}$ of a second, and so on). The tool maintenance counters can include time data related to various processes (e.g., RF (radio frequency) hours since last wet clean, elapsed time since focus ring was replaced, thickness of focus ring over time, and so forth). The arbitrary metrology measurements can include various information (e.g., mean CD, Etch rate, CD-1 at <x1,y2> coordinate, CD-2 ad <x2,y2> coordinate, and so on.) which can include information related to before and after processing. The metrology measurements can be supplied with the tool parameters and maintenance counters to the biologically based learning system 100 for training purposes, for example.

The biologically based learning system 100 can utilize several methods to align the data (e.g., transform 1/10-th second readings into 1-second readings by averaging, generate wafer level mean values and standard deviations of sensors measurements and then align with wafer level metrology, generate step level mean, standard deviation, minimum, maximum, range etc. of sensors measurements and then align such step level summaries with wafer level metrology, and so forth).

The biologically based learning system 100 analyzes the recipes to identify target settings for recipe parameters. Based on analysis of the recipe the biologically based learning system 100 performs additional transformations (e.g., measured value–target value for each sensor reading for each second of the process) to produce different perspectives of the data. Transformed data is then converted into a matrix form with several rows and columns. The biologically based learning system 100 comprises a library of such useful transformations that when submitted for learning yield useful deductions when analyzing the results of analysis.

In accordance with some aspects, each column of a matrix contains tool sensor measurement data, tool part maintenance data, or tool metrology data. Each row represents some unit of processing (e.g., second, step, wafer, lot, etc.). The autonomous system (e.g., biologically based learning system 100) learns a behavioral relationship between a distinguished column of interest and all (or some subset of) remaining columns. These relationships establish the behavioral correlation between outputs of interest (e.g., CD or sensor or maintenance counter) and other parameters (metrology, sensors, or maintenance counters). Further capabilities of an autonomous systems that can be utilized with the disclosed aspects are described in co-pending U.S. patent application Ser. No. 12/416,018, entitled "METHOD AND SYSTEM FOR DETECTION OF TOOL PERFORMANCE DEGRADATION AND MISMATCH", filed on Mar. 31, 2009; and co-pending U.S. patent application Ser. No. 12/044,958, entitled "AUTONOMOUS BIOLOGICALLY BASED LEARNING TOOL," filed on Mar. 8, 2008; and co-pending U.S. patent application Ser. No. 12/044,959, entitled "AUTONOMOUS ADAPTIVE SEMICONDUCTOR MANUFACTURING," filed on Mar. 8, 2008. The entireties of these applications are incorporated herein by reference.

The disclosed aspects have the advantage of providing a convenient way for tool engineers, field support personnel, and other users to rapidly analyze the results produced by the biologically based learning system 100.

Figure 2:
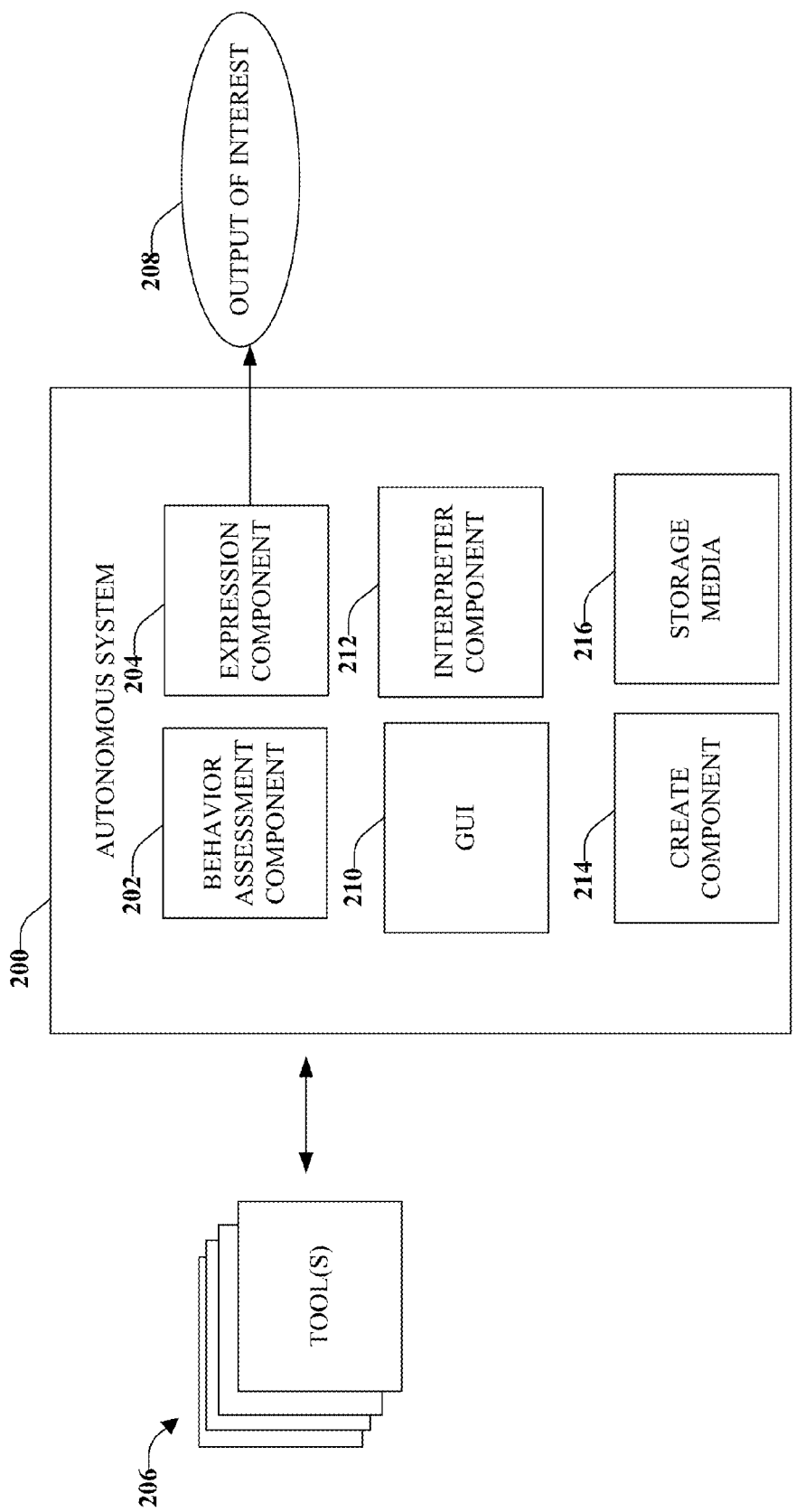
FIG. 2 illustrates an exemplary autonomous system configured to provide analysis of chamber matching performance for semiconductor manufacturing tools, according to an aspect.

FIG. 2 illustrates an exemplary autonomous system 200 configured to provide analysis of chamber matching performance for semiconductor manufacturing tools, according to an aspect. As compared to conventional analysis techniques, autonomous system 200 can provide analysis in a more rapid and timely manner.

Included in the autonomous system 200 are a behavior assessment component 202 and an expression component 204. The behavior assessment component 202 is configured to learn or evaluate the behavior of one or more tools 206. Expression component 204 is configured to express each output of interest 208. The output of interest 208 can be based on the behavior learned by the behavior assessment component 202. The output of interest 208 can be expressed as a function of one or more tool sensors, tool maintenance counters, or other metrology data. In accordance with some aspects, the output of interest comprises metrology data, tool sensor measurements, tool maintenance counters, or combinations thereof. According to some aspects, the output of interest is a performance comparison of a focus chamber and a reference chamber.

A Graphical User Interface (GUI) 210 can be supported, at least in part, by autonomous system 200. Thus, at least a portion of the functionally of GUI 210 can be included in autonomous system 200. A wired or wireless communication link can couple the various systems, components, GUI 210, and one or more tools 206. Further, the expression component 204 and GUI 210 can support each other and can perform the same or similar functions.

In accordance with some aspects, GUI 210 can be the front end (e.g. the visible portion, the portion though which a user interfaces) for the autonomous system 200 (e.g., a biologically based learning system). Thus, in accordance with some aspects, the GUI 210 can directly connect to the one or more tools 206 to receive data and render (e.g., display or output in another perceivable format) analysis results, or combinations thereof, according to an aspect. According to some aspects, the GUI 210 interfaces with expression component 204 to render the output of interest 208. In accordance with some aspects, the GUI 210 is tool independent such that the GUI 210 can be utilized for a plurality of tool types (e.g., Etch, Chemical Mechanical Planarization (CMP), Thermal Processing, and so forth).

A user can interact with the GUI 210 (or autonomous system 200) though one or more selections, wherein each selection can be interpreted independently or in conjunction with one or more other selections, and different results rendered to the user. As used herein a user can be an actor and/or an entity (e.g., the Internet, another system, a computer, machinery, and so forth), hereinafter referred to as users and/or entity (or another term), depending on the context. The GUI 210 can render the analysis results (or can express the output of interest 208) though various means, including a progression of windows or screens. The progression of windows can build upon each other (e.g., a first window gathers a first set of data and a second window manipulates the first set of data, and so forth). The one or more windows can include a tool and chamber selection window that displays all the tools in a matrix and the chambers associated with each tool. Further, the GUI 210 can provide a means to drill down into details of the focus chamber, the reference chamber, or both the focus chamber and the reference chamber.

According to some aspects, the GUI 210 can provide notifications and/or alerts that are tailored per user and/or user role. For example, if a user is a quality assurance engineer and there is a problem detected based on the comparison, the user can be automatically informed of the detected problem. In such a manner, the user can be made aware of the situation and can begin to take action to determine the reason for the failure and make correction. In accordance with some aspects, the determination and/or correction can be made in conjunction with information processed by autonomous system and/or based on information received from autonomous system.

In accordance with some aspects, the GUI 210 can render a measures of merit window that allows the user to select the tool performance parameter of interest. A tool performance parameter is representative of the tool performance (e.g., tool Etch Rate, Final CD, and so forth). The disclosed aspects can supports cases where the user does not have data for tool performance indicators. In cases where there is no available data illustrative of tool performance, the disclosed aspects can construct a tool health metric as being representative of tool performance.

In an aspect, the tool performance health metric is based on the measured value of the sensors on the reference chamber for the training data set. A mean value for a tool parameter sensor is computed for the training period. The difference from the mean value is computed for each measurement and this difference is divided by the mean value and expressed as a percentage change. The total percentage change is then computed for all tool parameters by averaging. The larger the percentage change of the measured values from the mean value during training, the poorer the tool health.

Further, the GUI 210 can render a data range window that allows the user to refine the period of interest for the analysis. Additionally, the GUI 210 can render an error comparison window that allows the user to see which tool parameters/variables (e.g., sensors) impact the selected performance measures of merit.

According to some aspects, the GUI 210 can render a wafer level comparison window that enables the user to obtain a fine-grained perspective of what occurred during the processing of a particular wafer. The Report Window complements the fine-grained view by displaying how variation in the selected parameter in the Error Comparison window actually impacts tool performance.

Further, the GUI 210 can render a report window, as well as other windows. The report window can display a first graph for the focus chamber and a second graph for the reference chamber. Further, information related to the various windows will be provided in more detail below. Also, although the various windows are referred to as a progression of windows, the windows can be output in other manners, such as individually or at substantially the same time as one or more other windows.

In accordance with some aspects, the GUI 210 creates one or more matrices and an interpreter component 212 is configured to learn each column of the matrix as function of other columns and a create component 214 is configured to generate a distinct sample for each such learning. In an example, the autonomous system 200 can assign each learning (as determined by interpreter component 212) to a user. In accordance with some aspects, the user can be defined by a user name (e.g., friendly name) or through other means (e.g., identification number, biometric data, and so forth).

In accordance with some aspects, autonomous system 200 is configured to perform adaptive learning and/or to facilitate continuous process improvement. For example, autonomous system 200 can identify previously unidentified correlations between chambers (e.g., focus chamber, reference chamber, one or more other chambers), between batches of wafers, and so on. Based on the identified correlations, autonomous system 200 can be configured to automatically adapt one or more processes (or provide a recommendation to adapt the process (es)) in order to achieve a goal, remain within certain parameters, priorities, and so forth.

According to some aspects, a storage media 216 can be accessible by autonomous system 200, wherein the storage media 216 is accessed to obtain information related to one or more tools, identification of chambers within each of the one or more tools, or other information. Further, information created and/or obtained by autonomous system 200 can be retained in the storage media 216 for later retrieval. Although the storage media 216 is illustrated as contained within autonomous system 200, the storage media 216 can be external to autonomous system 200, and can be accessible though wired means and/or through wireless means.

Figure 3:
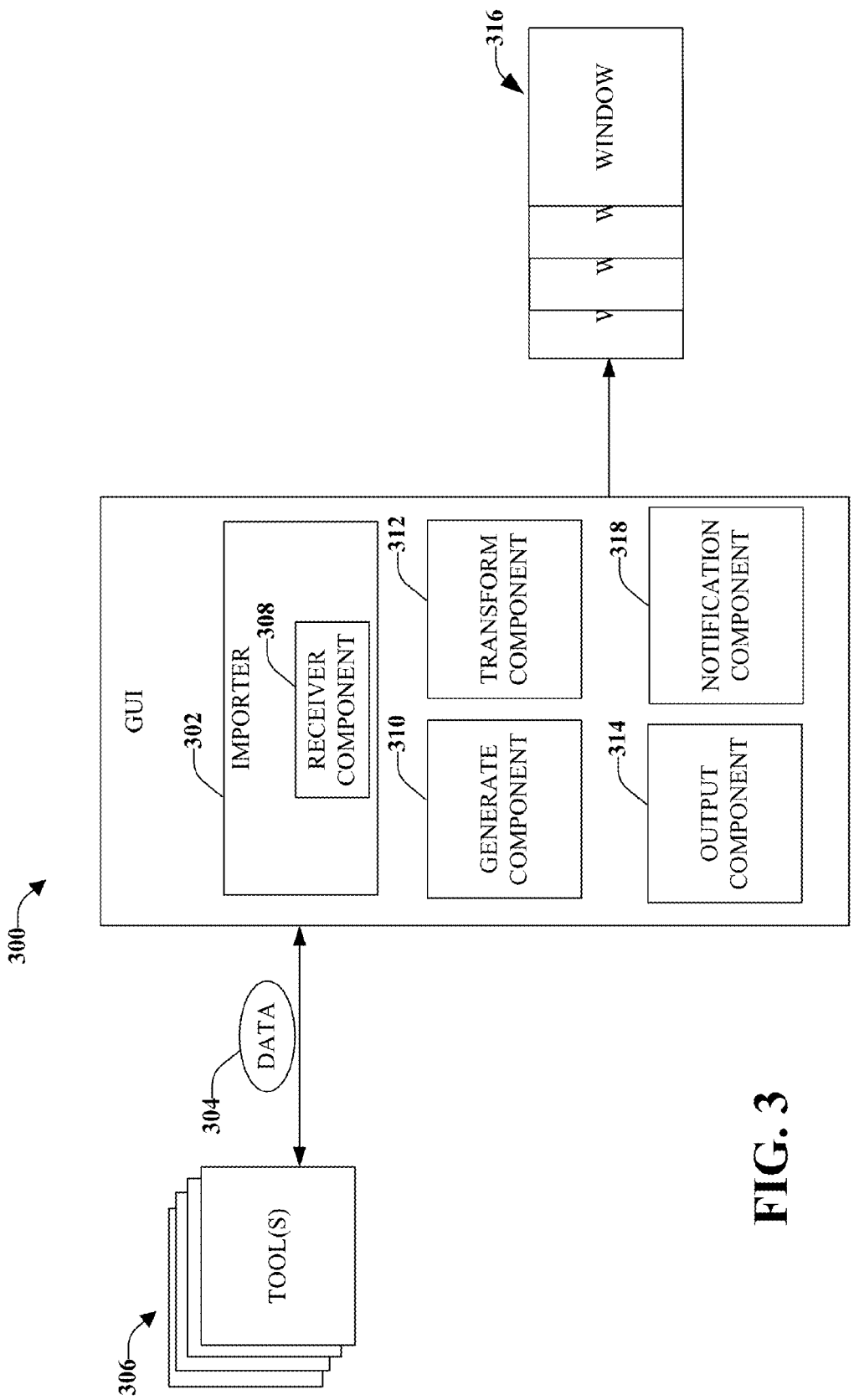
FIG. 3 illustrates an example graphical user interface (GUI) that provides analysis of chamber matching performance for semiconductor manufacturing tools, in accordance with an aspect.

FIG. 3 illustrates an example graphical user interface (GUI) 300 that provides analysis of chamber matching performance for semiconductor manufacturing tools, in accordance with an aspect. It should be noted that although components and related functions are shown and described with respect to the GUI 300, such components and/or functionality can be performed by an autonomous system supporting the GUI 300. GUI 300 comprises an importer 302 that is configured to receive information indicative of a reference chamber and at least one focus chamber(s). The information indicative of the reference chamber and the focus chamber(s) comprises sensor measurements, tool performance counter readings, metrology data, process recipes, system recipes, or combination thereof. For example, the importer 302 can allow data 304 to be input to the tool(s) 306 offline or directly from the tool(s) 306 (though a receiver component 308). In accordance with some aspects, importer 302 can be configured to import sensor measurements, tool performance counter readings, metrology data, process and system recipes, or combination thereof, and/or other data.

In accordance with some aspects, the importer 302 can be configured to receive (through the receiver component 308) data collected at a sampling frequency, which can be an arbitrary sampling frequency. Importer 302 can be associated with a generate component 310 that is configured to create at least one matrix based on the information received by the importer 302. For example, the generate component 310 can construct a matrix of data at lower frequencies (e.g., data received at $\frac{1}{10}$ of second is averaged and converted into one-second level readings). Additionally or alternatively, generate component 310 can be configured to generate at least two matrixes at different time resolutions (e.g., step level data, wafer level data, lot level data, PM level data, etc.). In accordance with some aspects, generate component 310 can be configured to generate various summary statistics for the imported data (e.g., information indicative of the reference chamber and/or the focus chamber). The summary statistics can include mean, standard deviation, range, maximum, minimum, and so forth for each time resolution of the various matrixes generated at the different time resolutions, according to an aspect. According to some aspects, the generate component 310 can create one or more matrixes and the autonomous learning system can learn each column of the one or more matrixes as a function of other columns and can generate a sample for each column.

The GUI 300 can also comprise a transform component 312 that is configured to generate one or more additional matrices of data by transforming the matrixes generated by the generate component 310. In accordance with some aspects, transform component 312 is further configured to transform each variable and express each value as: (measured-value−recipe-target-value), (measured value−mean-measured-value), etc. expressed as other matrices. Such matrices can be interpreted to the autonomous system.

In accordance with some aspects, GUI 300 can be configured to utilize various techniques, such as matching algorithms, relational databases, filters, artificial-intelligence systems, convergence components, and so forth. Such techniques can be dynamically interfaced with the GUI 300 so that simple user interface instructions can leverage off the powerful underlying components of the GUI 300 (or other system components) to quickly model data, analyze data, output data, and perform other functions.

In accordance with some aspects, one or more windows of the progression of windows can dynamically change as a function of a user and/or a user role. For example, the user (entity, actor, and so forth) can be identified, such as through a unique identifier (e.g., user name/password combination, IP address, and so forth). Based on the user and/or the user role, data might be output differently (e.g., in visual format to a first actor, in audio format to a second actor, and so forth). In accordance with some aspects, based on the user and/or user role, more or less data might be output (e.g., more data for a person with a high security level, less data for a person with a medium or low security level, more data for a supervisor, less data for a line worker, and so forth). According to some aspects, the one or more windows can dynamically change based on a location of the user in comparison to the one or more tools and/or autonomous system. For example, the user is near a tool, and a change to one or more processing parameters is noticed, indicating a problem. In this situation, information related to the change can be output to the user at about the same time as the change is detected so that the problem can be corrected.

According to some aspects, the one or more windows can dynamically change as a function of an urgency of the data and/or an emergency. For example, a window might automatically be displayed, regardless of user selection, if there is a major problem, there is a catastrophic failure, and so forth.

In some aspects, the one or more windows can dynamically change as a function of priorities, which can be predefined, configurable, or automatically inferred. For example, a priority relates to a wafer level comparison. If a change (negative or positive) occurs with respect to the wafer level comparison, information related to that change can be automatically rendered based on the priority.

In accordance with some aspects, the GUI 300 can auto-configure as a function of the user, user role, urgency, priorities, emergencies, locations, and so forth. Additionally or alternatively, the GUI 300 can auto-configure based on the rendering device. For example, if the rendering device has a small screen, the window (or screen) can be automatically reconfigured to enable all of the information, or a subset thereof, to be displayed on the screen and/or on multiple screens (e.g., through a scrolling technique).

GUI 300, through an output component 314, can render a progression of windows (e.g., one or more windows 316 (or screens)) to a user (although the data can be rendered though other perceivable means, such as audible means). The progression of windows comprises performance analysis results that compare the reference chamber and the focus chamber.

For example, the GUI 300 can begin by displaying a set of tools and chambers that can be analyzed. When the tool is launched, a screen or window can be rendered to the user (e.g., on a display). In accordance with some aspects, within the window there can be one or more active buttons, icons, or other selection means. For example, there might be only one active button within an upper left corner of the window (or another area of the window). In another example, an active button can be a leftmost button (e.g., a square grid with one highlighted cell) that prompts the user to click on the "active" button. Clicking on the button can bring up a "Tools and Chambers" display window, for example.

According to an aspect, the GUI 300 infrastructure allows the windows to communicate with each other through a notification component 318 that propagates one or more changes to each window in the progression of windows. For example, the Measures of Merit window can pass pertinent information about reference/focus chambers, the selected measure of merit, and the good/bad definitions to either or both the Date Window, the Error Comparison window, and the Report Window.

Figure 4:
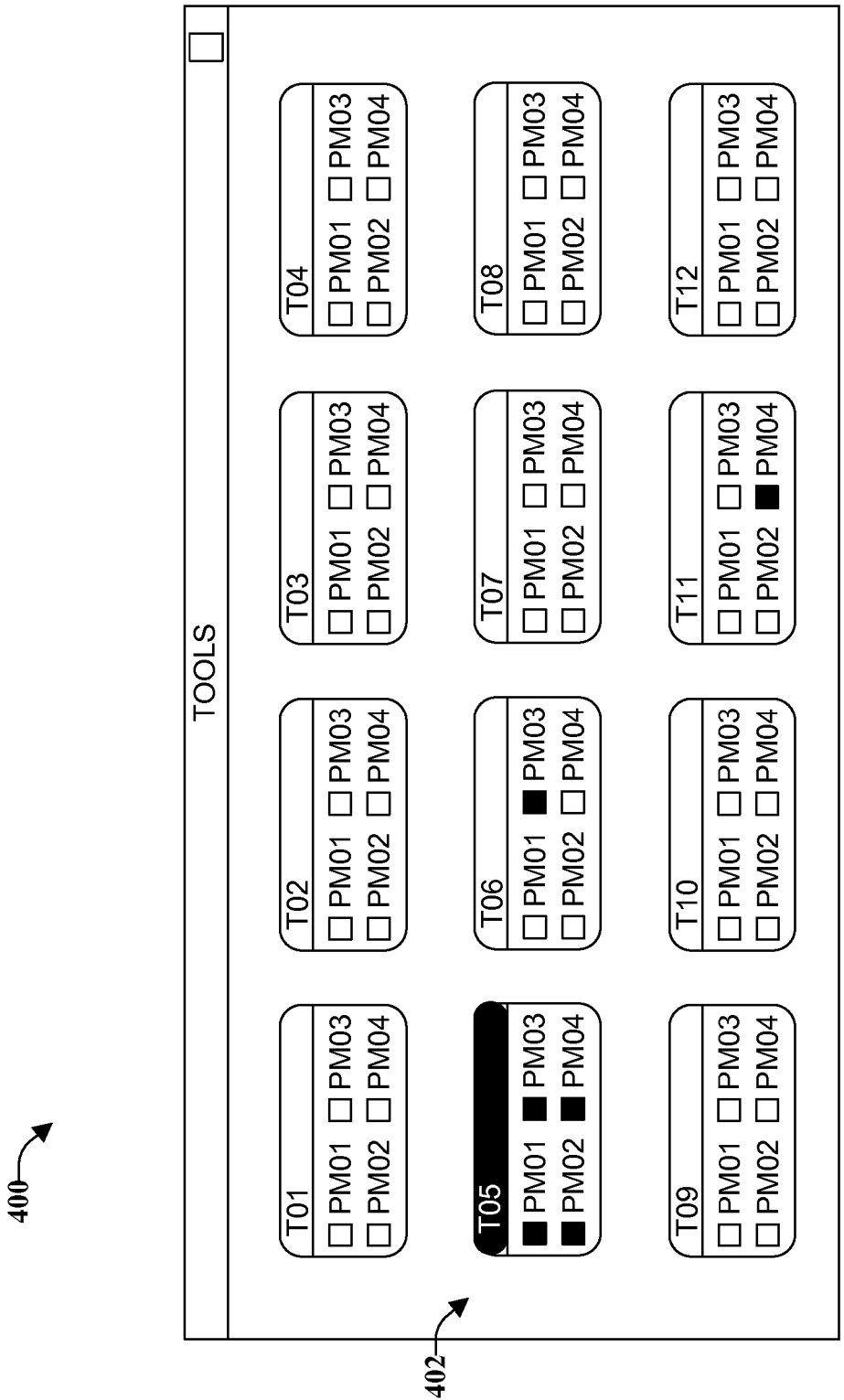
FIG. 4 illustrates an example tool and chamber selection window, according to an aspect.

FIG. 4 illustrates an example tool and chamber selection window 400, according to an aspect. The tool and chambers selection window 400 can display all the tools in a matrix or a subset of tools in the matrix. The illustrated tools are labeled as T01 through T12, wherein each tool comprises chambers identified as PM01 through PM04. In accordance with some aspects, the list of tool and chamber identifiers can be retrieved from a storage repository (e.g., storage media 216 of FIG. 2, reference repository 106 or matching repository 110 of FIG. 1) when the user clicks on the "Tools and Chambers" icon or makes another selection that indicates that the tools and chambers selection window 400 should be displayed.

The tool and chambers selection window 400 can be configured to allow a user to select one or more chambers (e.g., PM01 through PM04) from several tools (e.g., TM01 through TM12) for analyzing performance. In accordance with some aspects, the available tools and chambers can be displayed in an organized manner, which can facilitate use of (ease of performing) chamber and tool selection. However, in accordance with some aspects, the tools and chambers can be displayed in other manners.

Within each tool, a list of chambers (e.g., PM01 through PM04) is displayed as a matrix with check boxes, for example, next to the chamber names. The user is provided the option of selecting (e.g., clicking on) one or more tools (T01 through T12). When a tool is selected, the display for the tool changes color or another type of indication is utilized to identify the tool (e.g., color change, shade change, highlighting, and so forth). At about the same time as the tool is identified, the user is allowed to select one or more chambers from the tool. In the illustrated example, tool "T05" 402 has been selected (the tool name is highlighted or appears in a different color than the other tools) and a selection to display all the chambers (PM01, PM02, PM03, and PM04) for tool "T05" 402 have been chosen, as indicated by the filled check boxes. Alternatively, the user can select less than all the chambers from tool "T05" 402. Selecting the tool and chambers (tool "T05" 402 and its respective chambers in this example) can cause the GUI to bring up a next window, which can be a "Measures of Merit Window".

Figure 5:
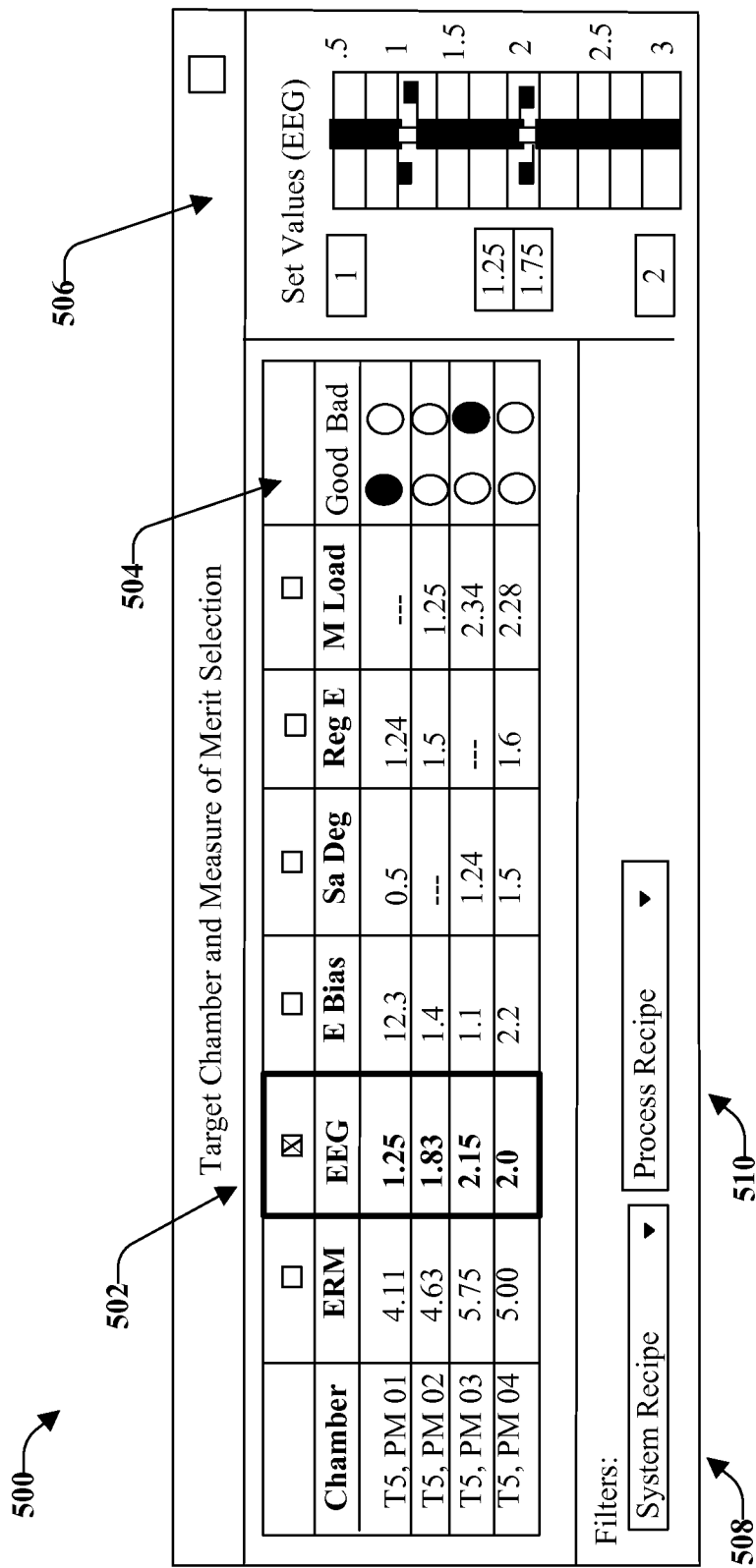
FIG. 5 illustrates an example measures of merit window, according to an aspect.

An example measures of merit window 500 is illustrated in FIG. 5, according to an aspect. The measures of merit window 500 can be configured to display a list of tool performance measures that includes the chambers selected from the tools in the tool and chambers selection window 400 (as discussed above). The tool performance measures can include Thickness, CD, Etch Bias, Die Count Loss, and so forth.

In accordance with some aspects, the measures of merit window 500 is configured to provide the ability to define a measure of metric when no tool performance metrology data is available. In another aspect, the measures of merit window 500 is configured to provide the user the ability to select the tool performance measure of interest. Additionally or alternatively, the measures of merit window 500 can be configured to provide the user the ability to select a chamber as a reference chamber and select another, different chamber (or the same chamber) as a focus chamber.

In another aspects, the measures of merit window 500 can be configured to provide the user the ability to define levels of performance, such as "good", "acceptable", "unacceptable", or other levels of performance. For example, good performance can be indicated by the color green, acceptable performance can be indicated by the color yellow, and unacceptable (or bad) performance can be indicated by the color red. However, other colors and/or indicator means (e.g., number ranking scheme and so forth) can be utilized to indicate the performance.

According to another aspect, the measures of merit window 500 can be configured to provide the user the ability to specify a set of system and process recipes as the focus of the analysis. According to some aspects, the measures of merit window 500 can be rendered (e.g., displayed, shown on a GUI display, and so on) at substantially the same time as when the user has selected one or more chambers in the tool and chambers selection window 400.

Tool performance analysis can commence with some tool performance measure being out of specification. The measure of merit window 500 allows the user to select the tool performance measure of interest by the clicking on a selection, such as the illustrated check box 502. The measure of merit window 500 displays the mean value for all available measures of merit over a specified time period, such as the last three months of processing, for example. According to some aspects, the specified time period (or default time period of interest) can be defined based on various criteria (e.g., a specific time period, such as the last three calendar months from "now") or based on rules or policies (e.g., company policies). In accordance with some aspects, the user can specify some other time period of interest as a default value and/or as a configurable value.

To indicate that a particular measure of merit is of interest, the user can select the check box 502 (e.g., EEG). After the particular measure of merit is selected, the user can select a reference chamber and a focus chamber. For example, the reference chamber can be a chamber that is performing at a high level (e.g., good performing chamber) and the focus chamber can be a chamber that is performing at a low level (e.g., bad performing chamber). The reference chamber and the focus chamber can be selected though various selection means. An example selection means is illustrated by the circular boxes under the good/bad heading 504 (e.g., a chamber selected as good can be used as the reference chamber and another chamber, selected as bad, is used as the focus chamber).

Additionally, the user can be provided selectors to rate the performance of each chamber. For example, as illustrated, the user can define good performance, medium performance, and bad performance (although other performance levels could also be provided) by using sliders, as indicated at 506. For example, the user may indicate that measured values less than or equal to 1.25 indicate a good performance level, measures from 1.26 to 1.75 indicate a medium performance, and measures above 1.76 indicate a bad performance level. The sliders for defining good/bad performance can be functionally rich so that the user can state complex criteria such as: from 1 through 1.25 indicates "good" performance, 1.26 through 2.25 indicates "medium" performance, 2.25 through 3.0 indicates "bad" performance, 3.0 to 3.25 indicates "medium" performance, and above 3.26 indicates "good" performance. However, other criteria can be defined by the user according to the disclosed aspects (e.g., different ranges, more ranges, fewer ranges, and so forth).

Additionally or alternatively, the user can further constrain the analysis by focusing the analysis on one or more system and process recipes. For example, within the measures of merit window 500 the set of system recipes run on a particular chamber (e.g., reference chamber, focus chamber) can be displayed. In accordance with some aspects, the user can select one or more system recipes 508 for analysis such as with a drop down box or by directly entering the information though interaction with a user interface (e.g., keyboard, mouse, voice recognition, and so on). Further, the user can select one or more process recipes 510, wherein the user is provided the ability to focus analysis attention on one or more process recipes of interest. Given a set of system recipes 508 and process recipes 510, the autonomous system (or GUI) can retrieve (e.g., from a storage media or storage repository) data that is related to the chamber (e.g., focus chamber, reference chamber) when processing any of the identified system recipes and/or process recipes.

At about the same time as an indication that the measure of merit and the reference/focus chambers have been selected (e.g., within the measures of merit window 500), additional windows can be displayed (e.g., though the GUI or other system components, such as computer 118 of FIG. 1). Such additional windows include a Date Window, which allows the user to refine the period of interest for the analysis, and an Error Comparison window, which allows the user to see which tool parameters/variables (e.g., sensors) impact the selected performance measure of merit.

Figure 6:
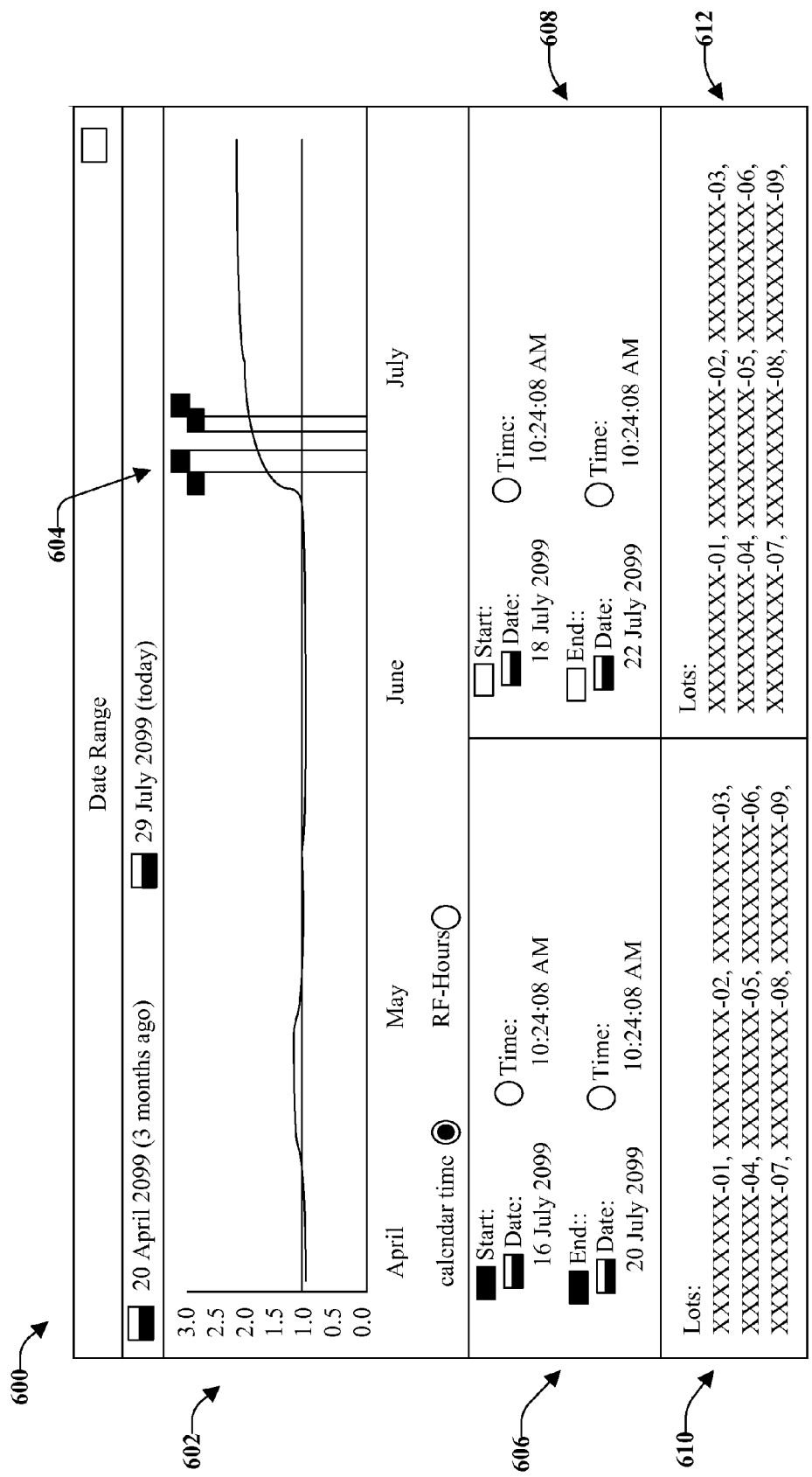
FIG. 6 illustrates an example of a date range window, according to an aspect.

An example of a date range window 600 is illustrated in FIG. 6, according to an aspect. The date range window 600 can show a trend graph (or another type of graph or chart) for the selected measure of merit for the reference chamber and the focus chamber. A pair of sliders can be provided for the focus window and another pair of sliders can be provided for the reference window. The sliders can be used to select a start date/time and an end date/time to bracket the period of interest for each chamber. In many cases, tool engineers analyze the deterioration in performance of the same chamber over time. Thus, the disclosed aspects allow the user to select both the reference chamber and the focus chamber as being the same chamber in the measures of merit window, which allows for analysis of the same chamber over time.

The Date Range Window 600 can be rendered (e.g., output, displayed, and so forth) at substantially the same time as a user has defined or rated the performance of each chamber (e.g., good/bad/acceptable performance in connection with the measures of merit window 500 of FIG. 5), in accordance with an aspect.

In some aspects, the date range window 600 can be configured to display (or output in another perceivable format) a trend of the selected measure of merit for a defined time period, which can be a default time period (e.g., the last three months, the last two weeks, and so forth) of processing on the focus chamber and the reference chamber. In accordance with some aspects, the date range window 600 can be configured to provide a capability to specify a default time frame that is different from the defined time period (e.g., a configurable data range). In an example, the trend can be presented in the form of a graph or plot 602.

In accordance with some aspects, the date range window 600 can provide the user with selectors 604 (e.g., sliders) that can be moved to specify a time frame of interest for the analysis of both chambers (focus chamber and reference chamber). For example, there can be a first start slider and a first end slider for the focus chamber and a second start slider and a second end slider for the reference chamber. Additionally or alternatively, the date range window 600 can be configured to allow the user to select start and end dates for the focus chamber 606 and reference chamber 608 using a calendar widget by explicitly specifying the start date/time and explicitly specifying the end date/time.

In a further aspect, the date range window 600 can be configured to allow the user to select at least one lot from a set of lots 610 for the focus chamber and to select a lot from the set of lots 612 for the reference chamber. The set of lots 610 for the focus chamber can be determined by the start and end time for the focus chamber and the set of lots 612 for the reference chamber can be determined by the start and end time for the reference chamber 608.

As the selectors 604 are changed, the start and end dates are displayed. If the specified period is narrow enough to encompass a few lots (e.g., around twelve) processed during the specified time periods, the lots are also displayed allowing the user to drill down the analysis to a single lot by selecting one specific lot, according to an aspect.

Figure 7:
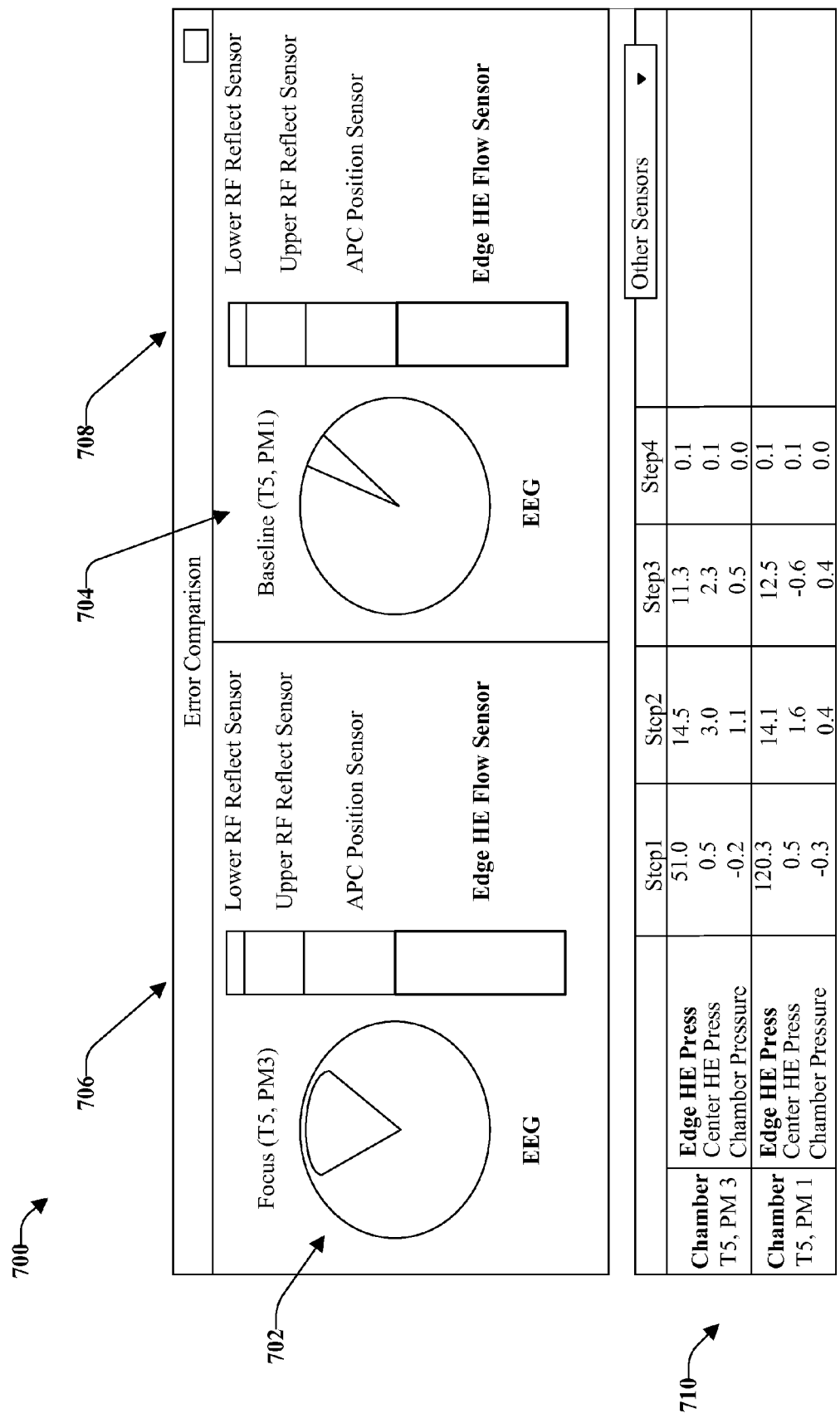
FIG. 7 illustrates an example error comparison window, according to an aspect.

FIG. 7 illustrates an example error comparison window 700, according to an aspect. The error comparison window 700 displays the factors (e.g., sensors) that influence the selected measure of merit. The error comparison window 700 can be displayed and/or updated in response to changes to the start/end dates for the focus chamber or the reference chamber in the date range window, as discussed with reference to the previous figure. In accordance with some aspects, the error comparison window 700 is configured to display a pie chart, a bar chart, and/or other charts for the reference chamber and a pie chart, a bar chart, and/or other charts for the focus chamber. According to some aspects, the error comparison window 700 is configured to use the functional relationship learned by the autonomous system to identify tool parameters (sensors, tool maintenance counter values) that impact the selected measure of merit from the measure of merit window. The chart for the reference chamber and/or focus chamber can display the top impacting tool parameters (e.g., top three, top five, top six, and so forth) based on computing the numerical partial derivatives for each independent variable of the learned relationship for the output measure of merit.

In accordance with some aspects, the chart utilizes deviation from normal values to display the top tool parameters that have drifted from their nominal values for the reference chamber. In an aspect, the chart shows the relative normalized impact on the selected measure expressed as a relative percentage for each of the top variables. In accordance with some aspects, each tool parameter of the chart of the error comparison window can be a different shade of color for the reference chamber and each parameter of the chart can be a different shade of color for the focus chamber. The color for the chart of the focus chamber is different from the color for the graph for the reference chamber, according to an aspect. However, other means of distinction can be utilized (e.g., different shading, different color, or shading patterns, as well as others).

In accordance with some aspects, the graph, chart, etc. of the focus chamber and/or reference chamber is labeled with a clickable tool parameter for each of the regions corresponding to the top tool parameters (e.g., five regions corresponding to the top five tool parameters). In another aspect, the chart of the reference chamber and/or focus chamber can display two wedges where the wedge corresponding to the top variables is the same color as the color for the reference chamber and/or focus chamber graphs (e.g., for comparison).

In accordance with some aspects, the error comparison window 700 displays a table of the top tool parameters that impact the selected measure of merit on a per step level for the focus chamber and the reference chamber.

In another aspect, the user can select (e.g., click) on any of the top variables within the error comparison window 700, which updates the top table display to show the top variables that impact the clicked variable on a per step basis. The top variables impacting the clicked tool parameter can be identified using numerical partial derivatives for the tool-parameter being expressed as a function of all other tool parameters.

According to some aspects, the error comparison window 700 provides the ability to select any of the top tool parameters displayed in the table to update the display and render (in a perceivable format) the top variables that impact the clicked tool parameter. In another aspect, the error comparison window 700 displays the current tool parameter name in a table header to show the current tool parameter of focus. In another aspect, the error comparison window 700 includes the option to select any other tool parameter that might not be shown in the top tool parameter by selecting a tool parameter from the "Other Sensors" drop-down list. The selection of a tool parameter in the error comparison window 700 can result in the display and/or update of a Wafer Level Comparison Window and the Report Window.

In an example, FIG. 7 illustrates a first pie chart 702 and a second pie chart 704 and a first bar chart 706 and a second bar chart 708 on the upper section of the error comparison window 700. The first pie chart 702 and the first bar chart 706 (on the left) are for the focus chamber and the second pie chart 704 and the second bar chart 708 (on the right) are for the reference chamber. The first bar chart 706 and second bar chart 708 represent the top factors (five in this example) that are functionally correlated to the selected measure of merit and are expressed in percentage terms (e.g., they are scaled and normalized so as to be meaningfully comparable). The scaled/normalized values computation depends on the selected relationship used to relate the measure of merit to the tool sensors.

The disclosed aspects support arbitrary relationships to be constructed between measures of merit and tool sensors/maintenance counters. For example, a mean Etch rate may be expressed as a function of tool parameters and tool maintenance counters using mathematical modeling techniques such as curve fitting, neural networks, or autonomous learning using genetic programming. Each such relationship can be given a name and the user can be provided with the option of selecting the desired model for analysis (not shown) within the error comparison window 700. In cases where the relationship is a function, a partial derivative can be numerically computed for each tool sensor/counter related to the output measure of interest. The values for the partial derivative for each sensor/counter can be divided by the sum of all the partial derivative values and expressed as a percentage.

The disclosed aspects can also support analysis where no mathematical model exists for analysis. In this case, the average value of each sensor/counter on the reference chamber during the period of interest can be taken as a "golden" value. The deviation from golden values is then used to indicate which sensor/counter has changed from its golden value. The deviation from golden values can be normalized by dividing by the sensors/counters golden value. The normalized deviation for each variable can be divided by the sum of all the normalized deviation values and expressed as a percentage.

Further, the disclosed aspects can display the top percentage contributors to the selected measure of merit in a chart (e.g., bar chart) where each of the top variables is shown with its relative contribution to the top variable; larger contributors are shown with larger areas. In FIG. 7, for example, Edge He Flow Sensor is seen as the largest contributor for the selected measure of merit. The total contribution of the top (e.g., five) sensors/counters may represent 20% of the total contribution, for example. This fact is pictorially depicted in the pie chart where the color of the bar chart can be the same as the wedge in the pie chart, according to an aspect, for comparison purposes.

The table 710 (illustrated below the pie/bar charts) shows the top (e.g. three) contributors to the measure of merit at step level granularity. These values can be computed in a manner similar to the computation used to create the top (e.g. five) contributors, however, the analysis is run on a step-by-step basis as opposed to a wafer level basis.

Further, the disclosed aspects allow the user to select (e.g., click on) any variable in the charts or the table. The selection brings up additional windows and instructs the GUI (or autonomous system) to focus on the clicked sensor/counter. The selection updates the table to display sensors/parameters contributing to the selected variable at the step level allowing the user to identify the parameters that are correlated to the selected variable.

Figure 8:
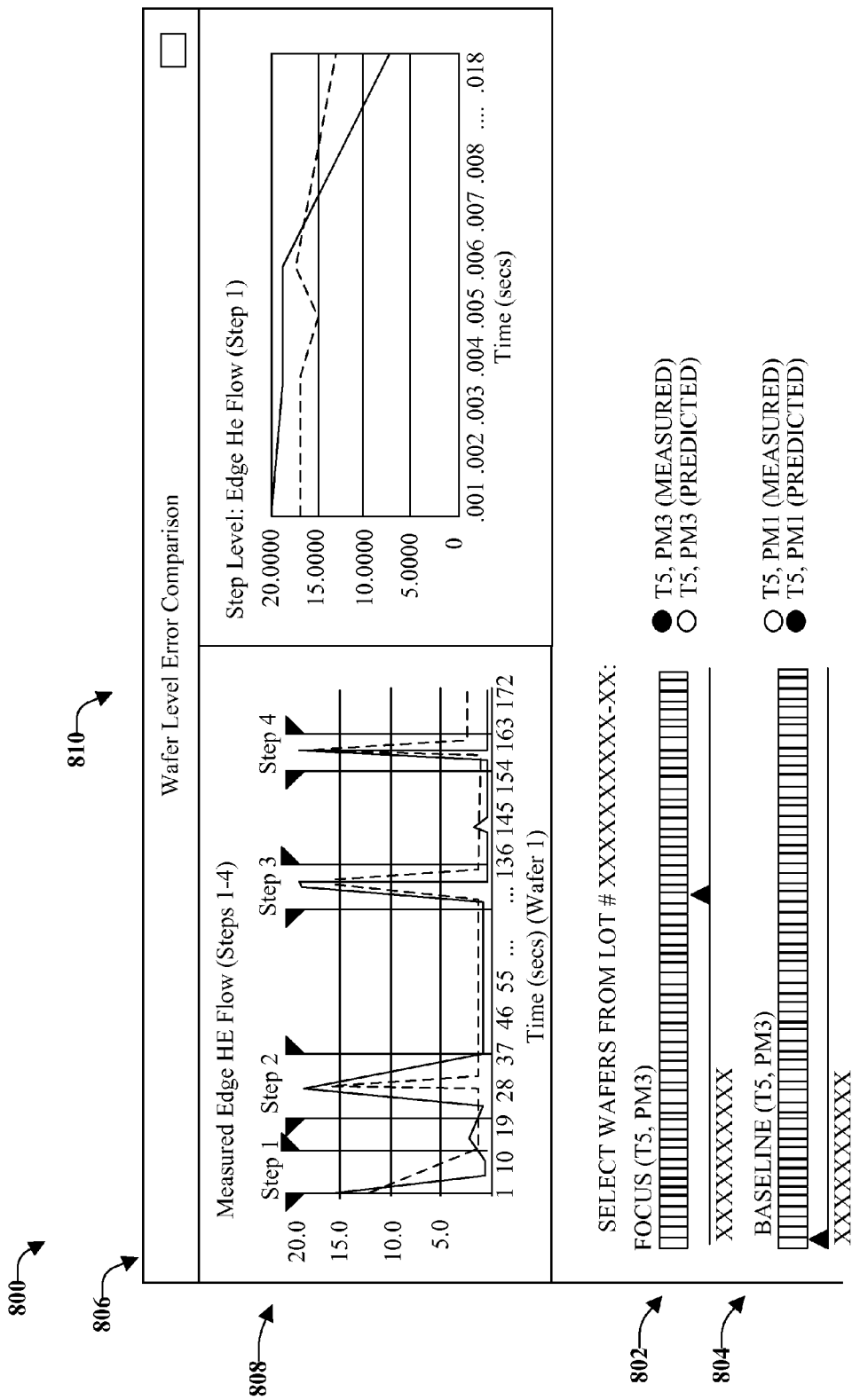
FIG. 8 illustrates a wafer level comparison window, according to an aspect.

FIG. 8 illustrates a wafer level comparison window 800, according to an aspect. The wafer level comparison window 800 allows the user to drill down on a particular wafer processed for analysis. The wafer level comparison window 800 can display trend lines on a tick-by-tick trend graph for an initially randomly chosen wafer for the reference chamber and a randomly chosen wafer for the focus chamber. In some aspects, the wafer level comparison window 800 provides the user with the option of showing the trend lines for measured values on the focus/reference chamber, predicted values for the reference/focus chamber or displays the measured and predicted values for the reference/focus chamber.

In an aspect, the wafer level comparison window 800 displays one color-coded ribbon bar for the reference chamber and another color-coded ribbon bar for the focus chamber. The ribbon bar can display a color-coded slice for each wafer of the lot selected in the date window for the focus chamber and the reference chamber. In accordance with some aspects, the ribbon bar provides a slider for selecting an individual wafer of a lot by simple movement of the slider (e.g., through a selection tool, touch screen, and so forth). The color-coding of the ribbon bar can be coordinated for bad performance, adequate performance, and good performance (as well as other performance levels). For example, red can be used for a bad performing wafer, yellow can be used for an adequate performing wafer, and green be used for a good performing wafer. The color-coding and the slider can allow the user to quickly compare wafers. For example, the comparison can include good wafers versus good wafers from the focus chamber and reference chamber. The comparison might include good wafers versus bad wafers from the focus chamber and the reference chamber. In another example, the comparison can include bad wafers versus good wafers from the focus chamber and the reference chamber. In still another example, the comparison can be between bad wafers versus bad wafers from the focus chamber and the reference chamber.

In accordance with some aspects, the tick-by-tick trend graph can display a clickable step number on top of the graph (or at another location). In an aspect, the clickable step number can display a zoom-in graph from the clicked step number. In a further aspect, the tick-by-tick graph can be equipped with a rectangular (or another shape) selection option whereby the area under the selected rectangle to zoom-in on an arbitrary rectangular area of the trend graph.

By way of example and not limitation, FIG. 8 illustrates a first ribbon bar 802 and a second ribbon bar 804 displayed at the bottom left of the wafer level comparison window 800. Each slice of the ribbon bars 802, 804 can be color coded to display performance levels (e.g., bad performance, acceptable performance, good performance, and so forth). For example, a slice can be colored red (for bad performance), yellow (for acceptable performance), or green (for good performance) as defined in the measures of merit window.

One ribbon is for the lot selected in the date window for the focus chamber and the other ribbon is for the lot selected in the date window for the reference chamber. The user has the ability to select a single wafer for both the focus chamber and the reference chamber. Note that when the window is initially displayed the automation system or GUI might randomly select a wafer for the focus chamber and the reference chamber to populate the initial tick-by-tick time series graph. However, in accordance with some aspects, the window can be populated based on a previous selection or based on other criteria.

When a wafer has been selected for the focus and reference chambers, the graph 806 (above the ribbon bars 802, 804) displays the time series tick-by-tick values of the tool parameter selected in the error comparison window. The user has the option of comparing only the measured values for the focus chamber and reference chamber or of comparing the predicted values for the focus chamber and reference chamber or comparing both the measured and predicted values for the reference and the focus chamber. The tick-by-tick time series compares the measured/predicted values for the selected tool parameter during the processing of the selected wafers.

As shown, above the tick-by-tick time series graphs 806 are step number labels 808 (illustrated as Step 1, Step 2, Step 3, and Step 4). A particular step number can be selected to show a zoom-in view of the tick-by-tick data in the zoom-in window 810 (shown on the upper right of FIG. 8). The user also has the ability to simply click on some point on the tick-by-tick time series graphs 806 and draw a rectangle on the graph to display the data contained in the rectangular (or other shape) selection in the zoom-in graph. The disclosed aspects thus support the ability to drill down to minute details to explore and analyze the possible cause for tool performance degradation.

Figure 9:
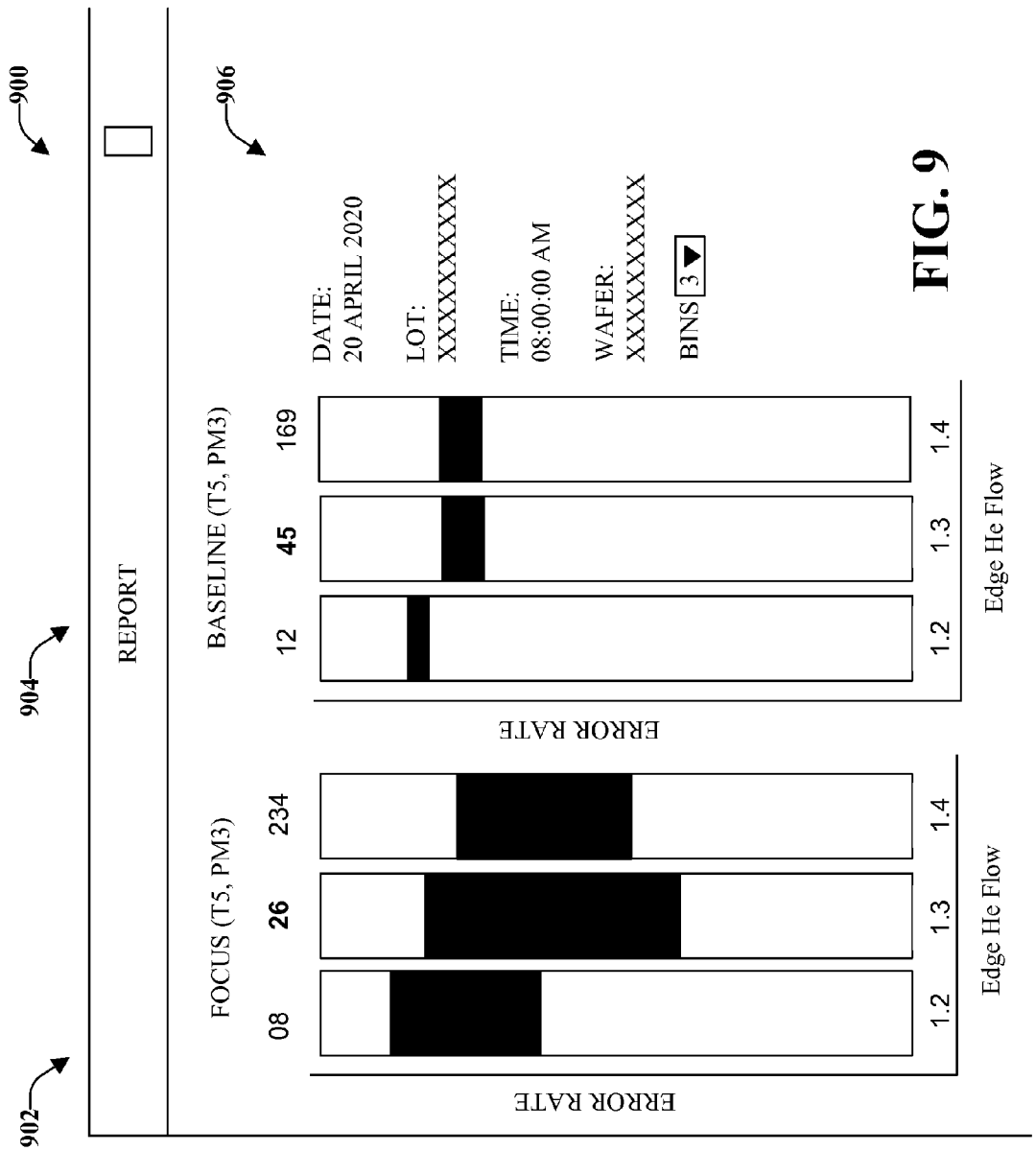
FIG. 9 illustrates a report window, according to an aspect.

FIG. 9 illustrates a report window 900, according to an aspect. The report window 900 can display a first graph for the focus chamber and a second graph for the reference chamber. Each graph can comprise color-coding (or another format for illustrating differences) for various performance levels (e.g., poor performance, adequate performance, good performance, and so forth). Each bar in a bar graph can be color coded with three (or more) colors, such as red for a poor performing wafer, yellow for an adequate performing wafer, and green for good performing wafer. In accordance with some aspects, there can be more (or less) than three colors or a different differentiation scheme can be utilized (e.g., different patterns, different shadings, and so forth). The size of each colored region of the graph can be the percentage or good, bad, and/or adequate wafers (or other performance levels).

In accordance with some aspects, the bar graph (or other style graph) is equipped with a bin size selector drop-down list that allows the user to select the number of bins. The selected bin size can result in one bar for each bin, according to an aspect. The midpoint for each bin can be displayed under each bar of the bar chart. The number of wafers included in each bin can be displayed on top of each bar (although other locations can be utilized).

The color coding of the performance levels (e.g., bad/adequate/good) of wafers for each bar can be such that a first region (e.g., top region) is for bad wafers, a second regions (e.g., middle region) is for adequate wafers, and a third region (e.g., bottom region) is for good wafers. The number of bad/adequate/good wafers in a bin (e.g., bar) can be defined by the size of each colored region in the bar (bin). The bar graph display for the focus chamber and the bar graph display for the reference chamber can provide the means for the user to visualize the impact on performance as the value of the tool parameter selected in the measure of merit window changes. The report window can include a display of the selected start and end times for both the reference chamber and the focus chamber as defined by the user in the date window.

As illustrated in FIG. 9, the report window illustrates a first bar graph 902 and a second bar graph 904. One bar graph is for the focus chamber and the other bar graph is for the reference chamber. The x-axis for each bar graph displays discreet values for the selected parameter in the error comparison window based on the selected number of bins (in FIG. 9 the user has chosen three bins). Each bar of the bar graph is partitioned into three distinct regions displayed with three distinct colors (or other means of distinction). For example, the percentage of wafers having bad performance can be shown as the color red, the percentage of wafers of acceptable performance can be in yellow (e.g. the solid black region in FIG. 9) and the percentage of wafers having good performance can be in green. The sum of the percentages should add up to 100 for each bar of the bar chart. This visual representation of performance allows the user to rapidly detect any trends. For example, in FIG. 9 as the Edge He Flow increases in the reference (baseline) chamber (right bar graph), the percentage of good wafers decreases whereas this observation does not hold for the focus chamber. When the user changes the bin size, the number of discreet bins increases and the bar graphs are correspondingly updated.

On the top (or at another location) of each bar the total number of wafers that fall within each bar is displayed. This allows the user to determine if sufficient wafers are available to support the observed trend.

The bar charts are based on the set of wafers processed between the start time and end time for the focus chamber and the reference chamber as identified by the selected start/end times in the date window. The user has the ability to broaden the selected date ranges or narrow the date ranges. Doing so updates the bar charts in the report window, updates the graphs in the error comparison window, and updates the tick-by-tick graphs in the wafer level comparison window.

The area 906 to the right of the bar charts in the report window 900 displays the start and end dates for each chamber and the process recipes that were used during the selected time frame.

The disclosed aspects thereby enable rapid analysis of chamber performance and allows the user to rapidly explore various tool parameters that may be the cause for tool performance degradation.

In accordance with some aspects, each window (as discussed above) comprises a question mark icon, a gear icon, a printer icon, and an export icon. For example, the question mark icon can be on the upper right of each window, the gear icon can be next to and to the left of the question mark icon, the printer icon can be on the upper left corner of the window, and the export icon can be located next and to the right of the printer icon. However, such elements can be located in other areas.

According to some aspects, the question mark icon can be configured to bring up a pop-up help window display to guide the user to use the functionality of the window. The gear icon can be configured to bring up a pop-up display window to allow the user to set options and configuration parameters not visible in the display of the window. The printer icon, when pressed or selected, can be configured to allow printing the current display of the window to a printer or to a graphics file format for inclusion in other documents. The export icon, when clicked, can be configured to allow the user to export the data used to construct the display in tabular format suitable for import to a database, spreadsheet application, etc.

In accordance with some aspects, the GUI is equipped with a publish/subscribe mechanism (e.g., communication mechanism) that allows all windows to notify other windows of changes. The communication mechanism can enable all windows to update their displays when relevant changes are made (e.g., update the Measure of Merit Window and the Report Window when the start/end times change for the reference chamber or the focus chamber in the Date Window; update the Wafer Level Comparison Window graph and the Report Window when the user clicks on a tool parameter in the Measure of Merit Window, etc.)

Figure 10:
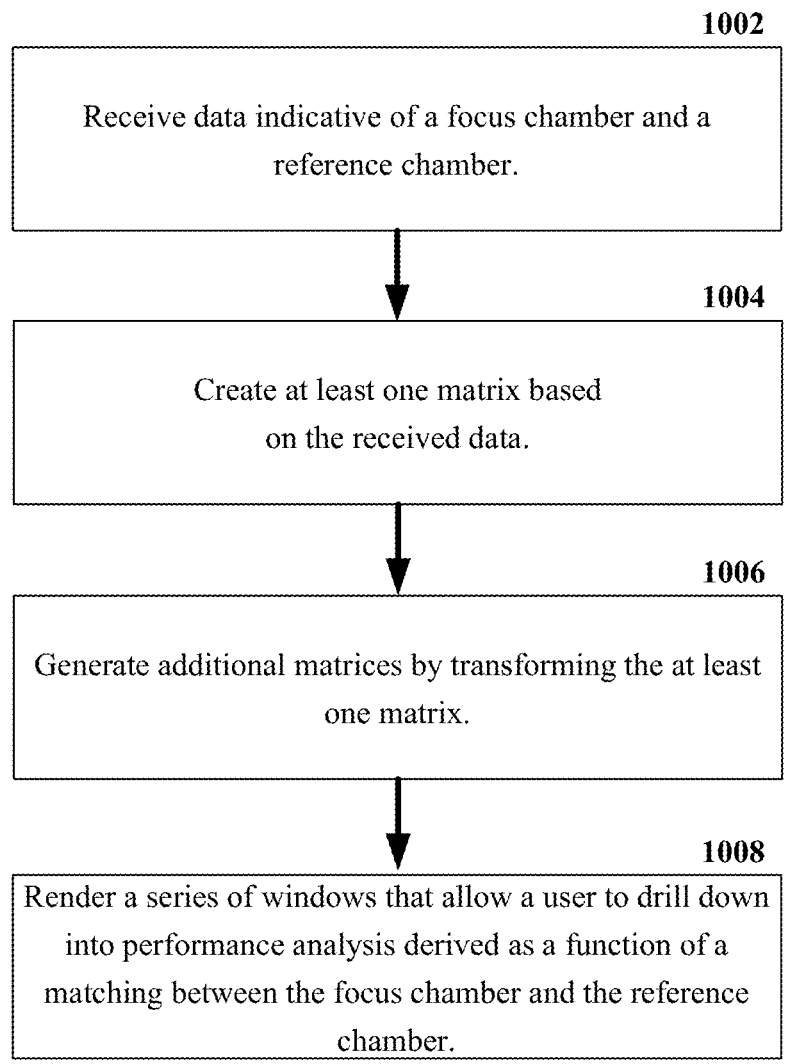
FIG. 10 illustrates a method for providing chamber matching performance analysis results, according to an aspect.

FIG. 10 illustrates a method for providing chamber matching performance analysis results, according to an aspect. Method starts, at 1002 when data indicative of a focus chamber and a reference chamber are received. The received data can include, but is not limited to, sensor measurements, tool performance counter readings, metrology data, process recipes, system recipes, or combinations thereof.

At 1004, at least one matrix based on the received data is created. In accordance with some aspects, at 1004, two or more matrixes are created, wherein each matrix is created at a different time resolution (e.g., step level data, wafer level data, lot level data, PM level data, and so forth). According to some aspects, the data, received at 1002, is collected at an arbitrary sampling frequency and the matrix, created at 1004, is constructed at lower frequencies (e.g., data received at 1/10 of a second is averaged and converted into one-second level readings).

Additional matrices are created, at 1006, by transforming the matrixes generated, at 1004. For example, each variable can be transported and expressed as: (measured-value–recipe-target-value), (measured value–mean-measured-value), etc. or expressed as other matrices. Such matrices can be interpreted by the autonomous system. For example, the autonomous system can learn each column of a matrix as a function of other columns and generate a distinct sample for each column.

At 1008, a series of windows is rendered. The series of windows allows a user to drill down into performance analysis derived as a function of a matching between the focus chamber and the reference chamber (regardless of whether the focus chamber and the reference chamber point to the same chamber or point to two different chambers). Thus, the series of windows allows performance analysis information to be retrieved in a detailed manner or in a more general (or high level) matter, depending on the desired analysis detail.

In accordance with some aspects, a first window is rendered, which can receive a selection of one or more chambers and a selection of one or more tools from several tools for performance analysis. According to an aspect, the first window is a tool and chamber selection window, as described in the above figures.

Further, a second window can be rendered that comprises a list of tool performance measures and can receive at least one of: a selection of a reference chamber and a focus chamber from a multitude of chambers; a selection of performance levels or performance level ranges; or a selection of a set of system recipes and process recipes as a focus of the analysis. In accordance with some aspects, the second window can receive a selection that indicates the same chamber should be used as the focus chamber and the reference chamber. However, in accordance with some aspects, the second window can receive a selection of a first chamber as the focus chamber and a second chamber as the reference chamber, wherein the first chamber and the second chamber are different chambers. In accordance with some aspects, the second window is a measures of merit window, as described in the preceding figures.

In further aspects, the series of windows comprises a third window that comprises a time-based trend as a function of the selection in the second window, wherein the trend is a function of a configurable date range. According to some aspects, the third window receives a selection of at least one lot from a set of lots, wherein the selection identifies at least one lot for the focus chamber and at least one lot for the reference chamber. In accordance with some aspects, the third window is a date range window, as described with reference to the figures above.

In another aspect, the series of windows comprises a fourth window that displays a first chart for the reference chamber and a second chart for the focus chamber. Additionally or alternatively, the fourth window is an error comparison window that is dynamically modified as a function of changes to a start date or an end date for the focus chamber or the reference chamber. The fourth window can be an error comparison window, as described with reference to the above figures, according to an aspect. According to some aspects, the method is supported, at least in part, by an autonomous system that learns a functional relationship and the fourth window uses the functional relationship to identify tool parameters that impact a measure of merit from the second window.

In accordance with some aspects, the series of windows comprises a fifth window that displays tick-by-tick trend lines at a wafer level. In an aspect, the fifth window is a wafer level comparison window as described with respect to the above figures.

Further, the series of windows can comprise a sixth window that displays a first chart for the focus chamber and a second chart for the reference chamber, wherein the first chart and the second chart indicate performance levels of wafers in the focus chamber and the reference chamber. In accordance with some aspects, the sixth window is a report window, as described with reference to the above figures.

In accordance with some aspects, the method further comprises receiving a change to a first parameter in at least one window of the series of windows and automatically updating at least a second parameter in all dependent windows of the series of windows. For example, a date range can be selectively modified by a user and, as a result of the modification, information in a second window is dynamically updated.

Thus, as described herein, a biologically based learning system autonomously learns relationships among a plurality of manufacturing tool parameters as applied to arbitrary semiconductor manufacturing tools. In accordance with some aspects, the biologically based learning system can be utilized with a plasma etch tool, a track tool, an oxide etch tool, and so forth. Moreover, the one or more embodiments allow arbitrary data to be supplied to the biologically based learning system in a flexible and incremental manner. The learning system can be targeted to rapidly identify tool behavior differences between a reference chamber and a chamber whose performance is to be matched to the reference chamber or for a reference chamber at different time intervals. Further, the one or more embodiments can enable rapid analysis and decision making to identify tool parameters that are the most plausible cause for performance degradation The biologically based learning system is configured to extend capabilities of chamber matching performance by providing a graphical user interface (GUI) for the rapid diagnosis and identification of tools parameters that are correlated to the loss of chamber performance.

Figure 11:
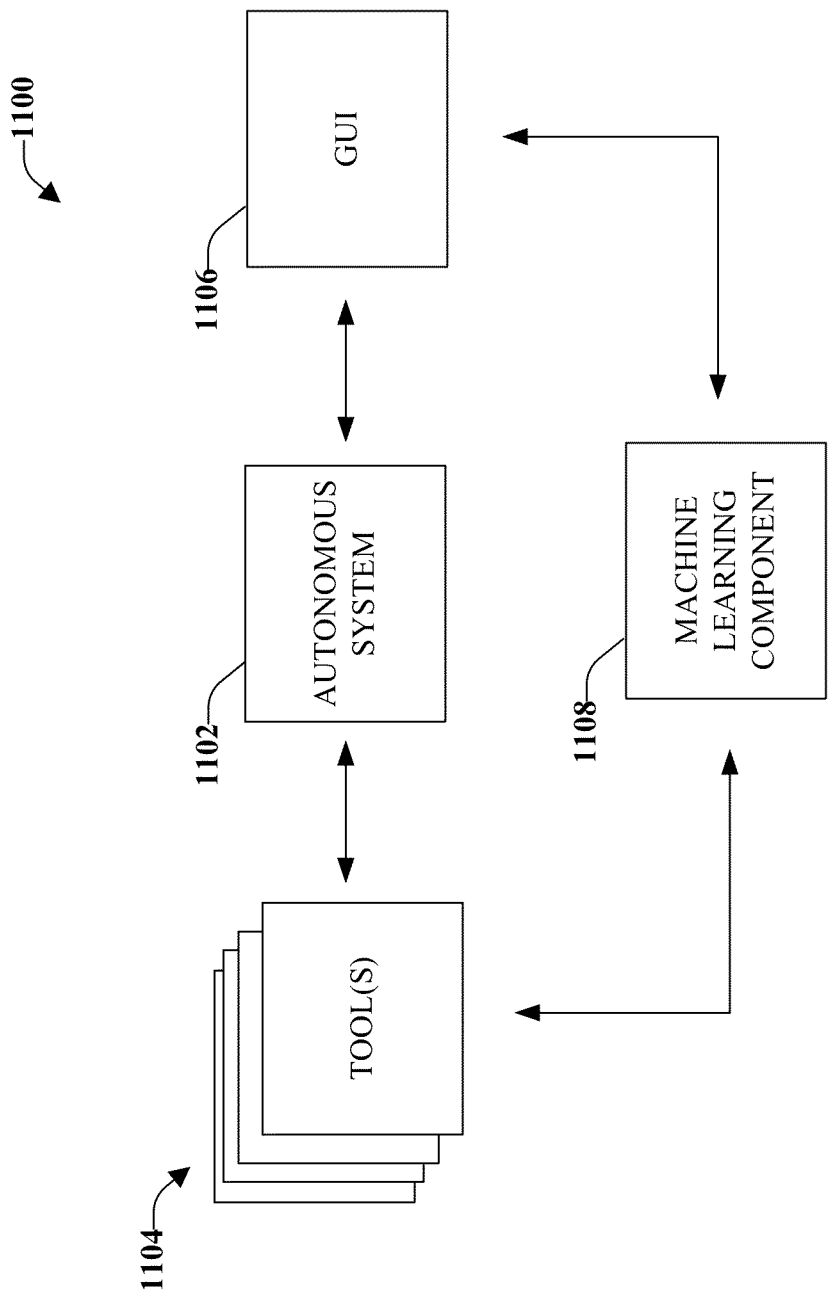
FIG. 11 illustrates a system that employs machine learning and reasoning to automate one or more features in accordance with the disclosed aspects.

FIG. 11 illustrates a system 1100 that employs machine learning and reasoning to automate one or more features in accordance with the disclosed aspects. Included in system 1100 is an autonomous system 1102 that is configured to provide analysis of chamber matching performance for semiconductor manufacturing tools 1104. For example, the autonomous system 1102 can receive information from the one or more tools 1104 (e.g., periodically, continuously, when a change occurs, or at other intervals). In accordance with some aspects, the autonomous system 1102 obtains (e.g., requests, pulls) the information from the one or more tools 1104 based on various criteria (e.g., a request for analysis, periodically, upon detection of a change, and so forth).

A GUI 1106 is associated with the autonomous system 1102 and is configured to communicate with the autonomous system 1102 and render analysis results (e.g., to a user). In accordance with some aspects, the GUI 1106 is located within the autonomous system 1102. According to some aspects, the GUI 1106 is a disparate component. The GUI 1106 can be configured to receive an input from a user and dynamically provide information tailored to the user request.

A machine learning component 1108 interfaces with the one or more tools 1104, the autonomous system 1102, and/or the GUI 1106. The machine learning component 1108 can employ various machine learning techniques to automatic one or more features. The machine learning component 1108 can employ principles of probabilistic and decision theoretic inference and rely on predictive models constructed through the use of machine learning procedures. Logic-centric inference can also be employed separately or in conjunction with probabilistic methods. The machine learning component 1108 can infer intention of a request (e.g., comparison of a reference chamber and a focus chamber) by obtaining knowledge about the possible actions and knowledge about what the user is trying to accomplish based on applications or programs being implemented by the user, the application/program context, the user context, or combinations thereof. Based on this knowledge, the machine learning component 1108 can make an inference based on which actions to implement, which reference chamber to reference, which focus chamber to reference, other chambers to employ, changes to selections received from the user (e.g., changes to a data or date range).

If machine learning component 1108 has uncertainty related to the intent or request, machine learning and reasoning component 1008 can automatically engage in a short (or long) dialogue or interaction with the user. In accordance with some aspects, machine learning component 1108 engages in the dialogue with the user through another system component. Computations of the value of information can be employed to drive the asking of questions.

In accordance with some aspects, machine learning component 1108 can be configured to automatically modify a process and/or a recipe to achieve a desired goal. The goal can be based on user instructions, based on comparison data, or based on other criteria and/or parameters. Alternatively or additionally, machine learning component 1108 can modify a process and/or a recipe as a function of tolerance levels (e.g., the amount of scrap that is acceptable, deviation change, and so forth).

The various aspects (e.g., in connection with receiving one or more selections, determining the meaning of the one or more selections, distinguishing a selection from other actions, implementation of selections to satisfy the request, and so forth) can employ various artificial intelligence-based schemes for carrying out various aspects thereof. For example, a process for determining if a particular action is a request for an action to be performed or a general action (e.g., an action that the user desires to perform manually) can be enabled through an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of selections, for example, attributes can be identification of a focus chamber and/or a reference chamber and the classes are criteria of the focus chamber and/or reference chamber that need to be utilized to satisfy the request.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to compare chambers, which chambers to compare, what chambers to group together, relationships between chambers, and so forth. The criteria can include, but is not limited to, similar requests, historical information, and so forth.

Figure 12:
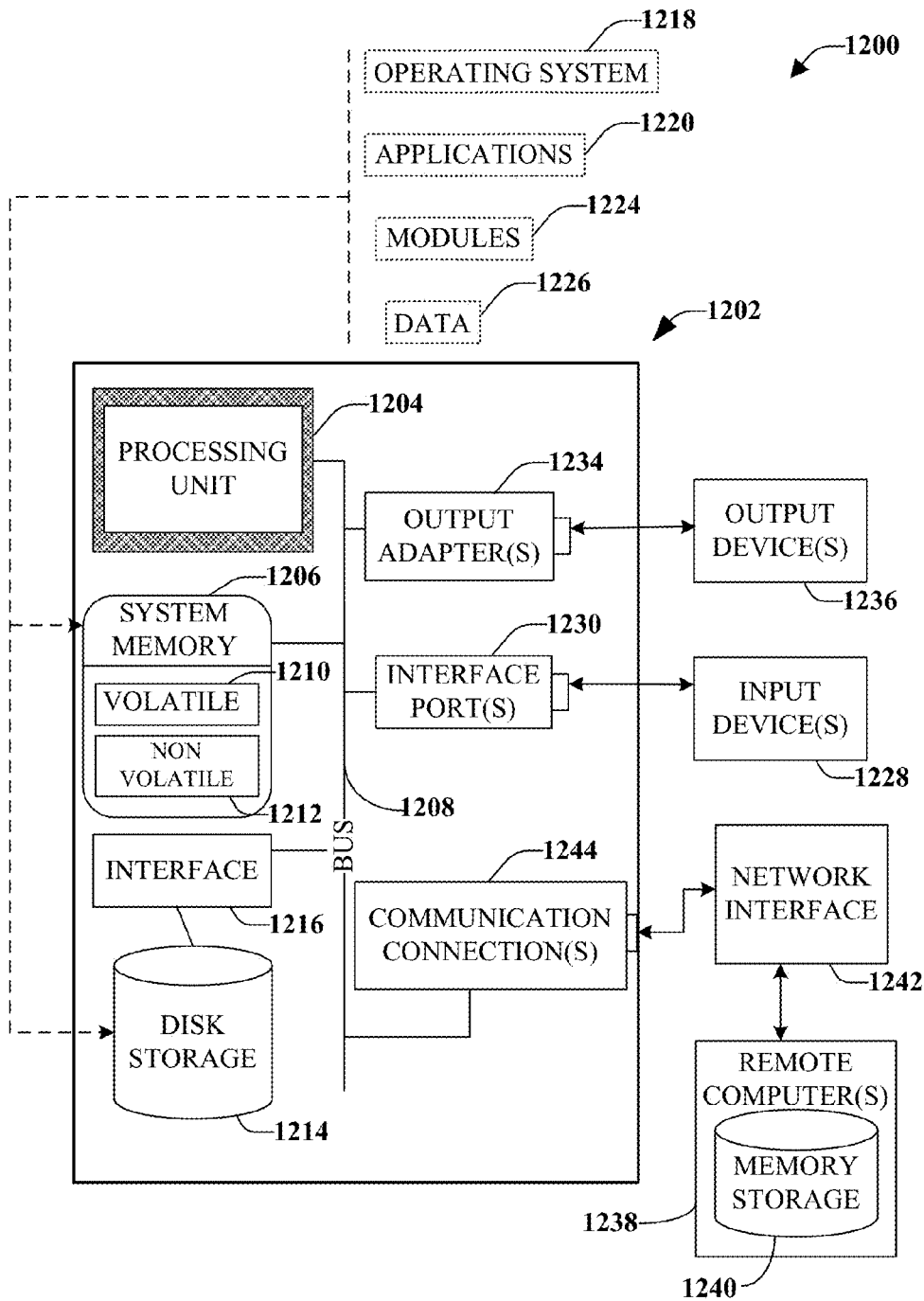
FIG. 12 illustrates a block diagram of a computer operable to execute the disclosed aspects.

Referring now to FIG. 12, illustrated is a block diagram of a computer operable to execute the disclosed aspects. In order to provide additional context for various aspects thereof, FIG. 12 and the following discussion are intended to provide a brief, general description of a suitable computing environment 1200 in which the various aspects of the embodiment(s) can be implemented. While the description above is in the general context of computer-executable instructions that may run on one or more computers, those skilled in the art will recognize that the various embodiments can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed aspects can be practiced with other computer system configurations, including single-processor or multiprocessor computer systems, minicomputers, mainframe computers, as well as personal computers, hand-held computing devices, microprocessor-based or programmable consumer electronics, micro-controllers, embedded controllers, multi-core processors, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, DRAM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, microwave, RF, infrared and other wireless methods (e.g., IEEE 802.12X, IEEE 802.15.4).

With reference again to FIG. 12, the illustrative environment 1200 for implementing various aspects includes a computer 1202, which includes a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes a disk storage 1214, which can include an internal hard disk drive (HDD) (e.g., EIDE, SATA), which internal hard disk drive may also be configured for external use in a suitable chassis (not shown), a magnetic floppy disk drive (FDD), (e.g., to read from or write to a removable diskette) and an optical disk drive (e.g., reading a CD-ROM disk or, to read from or write to other high capacity optical media such as the DVD). The hard disk drive, magnetic disk drive and optical disk drive can be connected to the system bus 1208 by a hard disk drive interface, a magnetic disk drive interface and an optical drive interface, respectively. The interface 1216 for external drive implementations includes at least one or both of Universal Serial Bus (USB)

and IEEE 1094 interface technologies. Other external drive connection technologies are within contemplation of the various embodiments described herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the disclosed aspects.

A number of program modules can be stored in the drives and RAM, including an operating system 1218, one or more application programs 1220, other program modules 1224, and program data 1226. All or portions of the operating system, applications, modules, and/or data can also be cached in the RAM. It is to be appreciated that the various embodiments can be implemented with various commercially available operating systems or combinations of operating systems.

A user can enter commands and information into the computer 1202 through one or more wired/wireless input devices 1228, such as a keyboard and a pointing device, such as a mouse. Other input devices (not shown) may include a microphone, an IR remote control, a joystick, a game pad, a stylus pen, touch screen, or the like. These and other input devices are often connected to the processing unit 1204 through an input device (interface) port 1230 that is coupled to the system bus 1208, but can be connected by other interfaces, such as a parallel port, an IEEE 1094 serial port, a game port, a USB port, an IR interface, etc.

A monitor or other type of display device is also connected to the system bus 1208 via an output (adapter) port 1234, such as a video adapter. In addition to the monitor, a computer typically includes other peripheral output devices 1236, such as speakers, printers, etc.

The computer 1202 may operate in a networked environment using logical connections via wired and/or wireless communications to one or more remote computers, such as a remote computer(s) 1238. The remote computer(s) 1238 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1240 is illustrated.

The remote computer(s) can have a network interface 1242 that enables logical connections to computer 1202. The logical connections include wired/wireless connectivity to a local area network (LAN) and/or larger networks, e.g., a wide area network (WAN). Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network through a wired and/or wireless communication network interface or adapter (communication connection(s)) 1244. The adaptor 1244 may facilitate wired or wireless communication to the LAN, which may also include a wireless access point disposed thereon for communicating with the wireless adaptor.

When used in a WAN networking environment, the computer 1202 can include a modem, or is connected to a communications server on the WAN, or has other means for establishing communications over the WAN, such as by way of the Internet. The modem, which can be internal or external and a wired or wireless device, is connected to the system bus 1208 via the serial port interface. In a networked environment, program modules depicted relative to the computer 1202, or portions thereof, can be stored in the remote memory/storage device 1240. It will be appreciated that the network connections shown are illustrative and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 13:
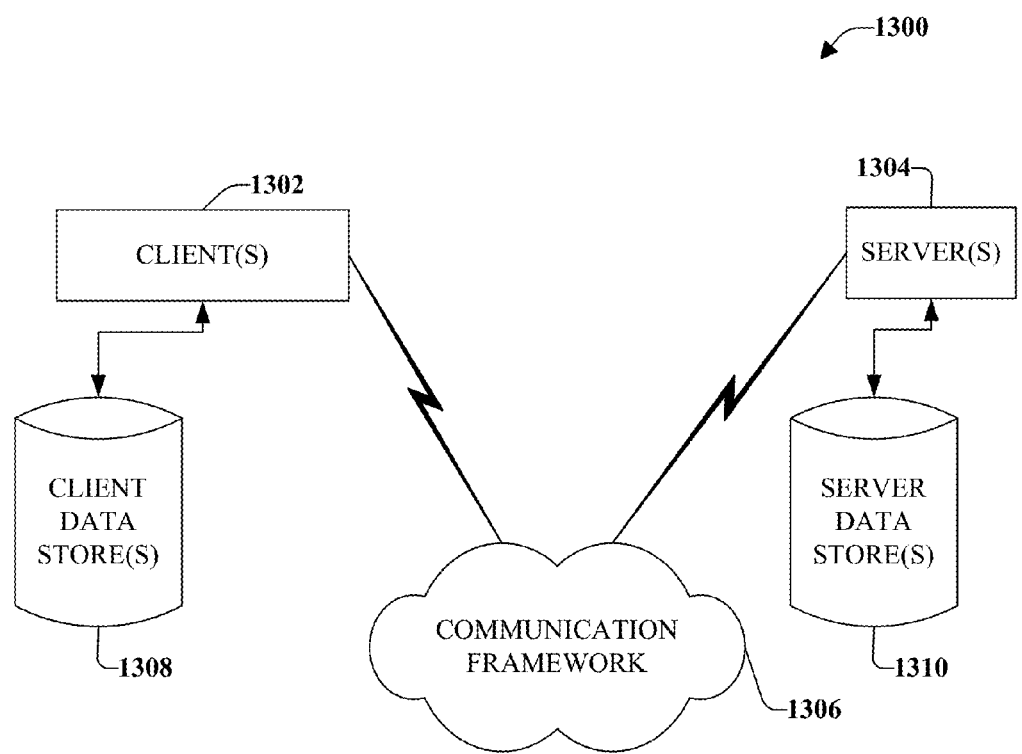
FIG. 13 illustrates a schematic block diagram of an exemplary computing environment, according to an aspect.

Referring now to FIG. 13, there is illustrated a schematic block diagram of an illustrative computing environment 1300 for processing the disclosed architecture in accordance with another aspect. The environment 1300 includes one or more client(s) 1302. The client(s) 1302 can be hardware and/or software (e.g., threads, processes, computing devices). The client(s) 1302 can house cookie(s) and/or associated contextual information in connection with the various embodiments, for example.

The environment 1300 also includes one or more server(s) 1304. The server(s) 1304 can also be hardware and/or software (e.g., threads, processes, computing devices). The servers 1304 can house threads to perform transformations in connection with the various embodiments, for example. One possible communication between a client 1302 and a server 1304 can be in the form of a data packet adapted to be transmitted between two or more computer processes. The data packet may include a cookie and/or associated contextual information, for example. The environment 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

The various techniques described herein may be implemented in connection with hardware or software or, where appropriate, with a combination of both. As used in this application, the terms "component", "module", "object", "service", "model", "representation", "system", "interface", or the like are generally intended to refer to a computer-related entity, either hardware, a combination of hardware and software, software, or software in execution. For example, a component can be, but is not limited to being, a process running on a processor, a processor, a hard disk drive, a multiple storage drive (of optical and/or magnetic storage medium), an object, an executable, a thread of execution, a program, and/or a computer. By way of illustration, both an application running on a controller and the controller can be a component. One or more components can reside within a process and/or thread of execution and a component can be localized on one computer and/or distributed between two or more computers, industrial controllers, or modules communicating therewith. As another example, an interface can include I/O components as well as associated processor, application, and/or API components.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via a flowchart, it can be appreciated that various other branches, flow paths, and orders of the blocks, may be implemented which achieve the same or a similar result. Moreover, not all illustrated blocks may be required to implement the methodologies described herein.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A graphical user interface that provides rapid analysis of chamber matching performance for semiconductor manufacturing tools, comprising:
   an importer that receives information indicative of a reference chamber and at least one focus chamber;
   a generate component that creates at least one matrix based on the information;
   a transform component that generates one or more additional matrices of data by transforming the at least one matrix; and
   an output component that renders a progression of windows as a function of the one or more additional matrices, wherein the progression of windows comprises performance analysis results that compare the reference chamber and the at least one focus chamber.

2. The graphical user interface of claim 1, the information indicative of the reference chamber and the at least one focus chamber comprises sensor measurements, tool performance counter readings, metrology data, process recipes, system recipes, or combinations thereof.

3. The graphical user interface of claim 1, is a front end for a biologically based learning system that directly connects to one or more tools to receive the information, to display the performance analysis results, or combinations thereof.

4. The graphical user interface of claim 1, is supported by an autonomous system that learns behavior of a tool associated with the reference chamber or the at least one focus chamber.

5. The graphical user interface of claim 1, wherein the information received by the importer is collected at an arbitrary sampling frequency and the generate component constructs the at least one matrix at a frequency that is different from the arbitrary sampling frequency.

6. The graphical user interface of claim 1, the generate component creates at least a second matrix, wherein each of the at least one matrix and the second matrix comprise different time resolutions.

7. The graphical user interface of claim 1, the generate component creates summary statistics for the information, wherein the summary statistics comprise, for each time resolution, a mean, a standard deviation, a range, a maximum, a minimum, or combinations thereof.

8. The graphical user interface of claim 1, the output component renders a first window that receives a selection of one or more chambers from a plurality of chambers and a selection of one or more tools from several tools for performance analysis.

9. The graphical user interface of claim 8, the output component renders a second window that comprises a list of tool performance measures and receives at least one of:
a selection of the reference chamber and the at least one focus chamber from the plurality of chambers;
a selection of performance levels or performance level ranges; or
a selection of a set of system recipes and process recipes as a focus of the performance analysis.

10. The graphical user interface of claim 8, the output component renders a second window that can receive a selection that indicates the at least one focus chamber and the reference chamber are the same chamber.

11. The graphical user interface of claim 10, wherein the output component renders a third window that comprises a time-based trend as a function of the selection in the second window, wherein the time-based trend is based on a configurable date range.

12. The graphical user interface of claim 11, the third window receives another selection of a first lot from a first set of lots for the at least one focus chamber, and a second lot from a second set of lots for the reference chamber.

13. The graphical user interface of claim 11, the output component renders a fourth window that displays a first chart for the reference chamber and a second chart for the at least one focus chamber.

14. The graphical user interface of claim 13, the fourth window is an error comparison window that is dynamically modified as a function of changes to a start date or an end date for the at least one focus chamber or the reference chamber.

15. The graphical user interface of claim 13, is supported, at least in part, by an autonomous system that learns a functional relationship and the fourth window uses the functional relationship to identify tool parameters that impact a measure of merit from the second window.

16. The graphical user interface of claim 13, the output component renders a fifth window that displays tick-by-tick trend lines at a wafer level.

17. The graphical user interface of claim 16, the output component renders a sixth window that displays a third chart for the at least one focus chamber and a fourth chart for the reference chamber, wherein the third chart and the fourth chart indicate performance levels of wafers in the at least one focus chamber and the reference chamber.

18. The graphical user interface of claim 1, further comprising a notification component that propagates one or more changes to each window in the progression of windows.

19. A system for biologically based chamber matching, comprising:
using a processor to execute the following computer executable components stored in a memory:
an autonomous learning engine that determines a behavior of a tool; and
a graphical user interface that expresses an output of interest, based on the behavior, as a function of one or more tool sensors, tool maintenance counters, or metrology data, wherein the output of interest is a performance comparison of a focus chamber and a reference chamber.

20. The system of claim 19, wherein the graphical user interface is a front end for the autonomous learning engine and directly connects to one or more tools to receive data, to display analysis results, or combinations thereof.

21. The system of claim 20, wherein the graphical user interface imports sensor measurements, tool performance counters readings, metrology data, process recipes, system recipes, or combinations thereof.

22. The system of claim 19, wherein the graphical user interface creates at least one matrix and the autonomous learning engine learns a first column of the at least one matrix as a function of at least a second column of the at least one matrix and generates a sample for the first column.

23. The system of claim 19, the graphical user interface renders the output of interest as a progression of windows that build upon each other.

24. The system of claim 19, the graphical user interface provides a means to drill down into details of the focus chamber, the reference chamber, or both the focus chamber and the reference chamber.

25. The system of claim 19, the graphical user interface is tool independent.

26. The system of claim 19, wherein the reference chamber and the focus chamber are the same chamber.

27. The system of claim 19, wherein the reference chamber and the focus chamber are different chambers.

28. A method for providing chamber matching performance analysis results, comprising:
receiving data indicative of a focus chamber and a reference chamber;
creating at least one matrix based on the received data;
generating additional matrices by transforming the at least one matrix; and
rendering a series of windows that provide performance analysis information between the focus chamber and the reference chamber.

29. The method of claim 28, further comprises receiving a selection of a first chamber as the reference chamber and a second chamber as the focus chamber, wherein the first chamber and the second chamber are different chambers.

30. The method of claim 28, further comprises receiving a selection of a first chamber as both the reference chamber and the focus chamber.

31. The method of claim 28, wherein the series of windows comprise a tool and chamber selection window, a measures of merit window, a data range window, an error comparison window, a wafer level comparison window, a report window, or combinations thereof.

32. The method of claim 28, further comprises receiving a change to a first parameter in at least one window of the series of windows and automatically updating at least a second parameter in all dependent windows of the series of windows.

* * * * *